(12) United States Patent
Manabe

(10) Patent No.: US 8,471,506 B2
(45) Date of Patent: Jun. 25, 2013

(54) MOTOR CONTROL APPARATUS

(75) Inventor: Shizuo Manabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 238 days.

(21) Appl. No.: 12/915,429

(22) Filed: Oct. 29, 2010

(65) Prior Publication Data

US 2011/0101899 A1    May 5, 2011

(30) Foreign Application Priority Data

Oct. 29, 2009 (JP) ................... 2009-248876
Jun. 15, 2010 (JP) ................... 2010-135862

(51) Int. Cl.
*H02K 29/10* (2006.01)

(52) U.S. Cl.
USPC ............ 318/400.04; 318/400.02; 318/400.21; 318/603

(58) Field of Classification Search
USPC .................. 318/400.04, 400.02, 400.21, 712, 318/722, 567, 603
See application file for complete search history.

(56) References Cited

U.S. PATENT DOCUMENTS

| | | | |
|---|---|---|---|
| 5,012,169 A | 4/1991 | Ono et al. | |
| 5,349,294 A * | 9/1994 | Kasuboski | 324/309 |
| 5,677,607 A * | 10/1997 | Sugiyama et al. | 318/400.21 |
| 6,694,238 B2 | 2/2004 | Ishihara | |
| 6,906,491 B2 * | 6/2005 | Matsuo et al. | 318/722 |
| 7,294,988 B2 * | 11/2007 | Ajima et al. | 318/712 |
| 2004/0257027 A1 * | 12/2004 | Matsuo et al. | 318/722 |
| 2005/0212475 A1 * | 9/2005 | Kakutani et al. | 318/567 |
| 2006/0125439 A1 * | 6/2006 | Ajima et al. | 318/716 |
| 2006/0273247 A1 * | 12/2006 | Sakamaki et al. | 250/231.13 |
| 2008/0297078 A1 * | 12/2008 | Iwasaki et al. | 318/400.02 |

FOREIGN PATENT DOCUMENTS

| | | |
|---|---|---|
| JP | 02-264306 A | 10/1990 |
| JP | 06-288791 A | 10/1994 |
| JP | 08-1388 B | 1/1996 |
| JP | 11299227 A | 10/1999 |
| JP | 11337371 A | 12/1999 |
| JP | 2000314639 A | 11/2000 |
| JP | 2003-137110 A | 5/2003 |
| JP | 2004061157 A | 2/2004 |
| JP | 2004242370 A | 8/2004 |
| JP | 2006-166677 A | 6/2006 |

(Continued)

OTHER PUBLICATIONS

Japanese Office Action issued Nov. 15, 2011 from JP 2010-135862 with partial English translation.

*Primary Examiner* — Paul Ip
(74) *Attorney, Agent, or Firm* — Gifford, Krass, Sprinkle, Anderson & Citkowski, P.C.

(57) ABSTRACT

A motor control apparatus includes a resolver and a R/D converter in which an electrical angle of 360° is set smaller than a mechanical angle of 360° and that outputs a two-phase encoder signal corresponding to the electrical angle; a two-phase encoder counter that counts the two-phase encoder signal and outputs a digital value corresponding to the electrical angle; a multiplication factor of angle detecting portion that detects a position of the mechanical angle to which an angle indicated by a signal output from the R/D converter corresponds, based on a change in a count value; and a motor controlling portion that corrects a current command value determined based on a torque command value, according to an output of the multiplication factor of angle detecting portion.

7 Claims, 15 Drawing Sheets

FOREIGN PATENT DOCUMENTS

| | | |
|---|---|---|
| JP | 2006-246601 A | 9/2006 |
| JP | 2006238663 A | 9/2006 |
| JP | 2006262668 A | 9/2006 |
| JP | 2006-288152 A | 10/2006 |
| JP | 2008259347 A | 10/2008 |
| JP | 2009077481 A | 4/2009 |
| JP | 2009-222576 A | 10/2009 |

* cited by examiner

EXAMPLE 10-bit TWO-PHASE ENCODER COUNTER

| TR = 20N·m | | TR = 40N·m | | TR = 200N·m | |
|---|---|---|---|---|---|
| ANGLE θ3· COUNT | CORRECTION COEFFICIENT K | ANGLE θ3· COUNT | CORRECTION COEFFICIENT K | ANGLE θ3· COUNT | CORRECTION COEFFICIENT K |
| 0.0 | K11 | 0.0 | K21 | 0.0 | Kn1 |
| 5.0 | K12 | 5.0 | K22 | 5.0 | Kn2 |
| . | . | . | . | . | . |
| . | . | . | . | . | . |
| . | . | . | . | . | . |
| 360.0 | K1n | 360.0 | K2n | 360.0 | Knn |

MOTOR CONTROL APPARATUS

CROSS-REFERENCE TO RELATED APPLICATIONS

This application claims priority to Japanese Patent Application No. 2009-248876 filed on Oct. 29, 2009 and Japanese Patent Application Publication No. 2010-135862 filed on Jun. 15, 2010 each including the specification, drawings and abstract is incorporated herein by reference in its entirety.

BACKGROUND OF THE INVENTION

1. Field of the Invention

The invention relates to a motor control apparatus, and more particularly, a motor control apparatus that uses an electrical angle in which an electrical angle of 360° is set smaller than a mechanical angle of 360°.

2. Description of the Related Art

A motor control apparatus is provided in a vehicle such as a hybrid vehicle or an automobile having an electric motor, or other electrical equipment having a motor. A rotation angle detecting apparatus that detects the rotation angle of the motor is used for this kind of motor control apparatus.

For example, Japanese Patent Application Publication No. 2009-77481 (JP-A-2009-77481) describes technology that uses a resolver as a rotation detecting sensor, and directs an R/D (resolver/digital) converter that converts the output of that resolver into a digital value to increase or decrease a count value.

The motor is basically controlled using the electrical angle that changes according to the number of pairs of poles. For example, in a motor with one pair of poles, the electrical angle matches the mechanical angle. However, in a motor with two pairs of poles, the electrical angle will the change from 0° to 360° twice for each one time that the mechanical angle changes from 0° to 360°. That is, in a motor with two pairs of poles, it is uncertain whether an output of an electrical angle from 0° to 360° corresponds to a mechanical angle of 0° to 180° or a mechanical angle of 180° to 360°.

In recent years, demand has grown for increased torque, reduced size, and smoother control in motors provided in vehicles, so it is possible that the number of pairs of poles in motors will increase from two to four or five, for example. In this case, a resolver with a multiplication factor of angle of 2, 4, or 5 (also denoted as 2x, 4x, or 5x) is normally used. The multiplication factor of angle is the ratio of the angle of one cycle of resolver output (normally the electrical angle θe) to the actual mechanical angle θm of the resolver. That is, the mechanical angle θm=the electrical angle θe/multiplication factor of angle N. Incidentally, the multiplication factor of angle is the factor not the angle, so the multiplication factor of angle may also simply be referred to as the multiplication factor in this specification.

However when a rotation angle sensor such as a resolver is made smaller or the multiplication factor of angle is increased, problems in machining accuracy may result in characteristic variation that corresponds to the multiplication factor even when the electrical angle is the same. When there is such variation in the characteristic of the sensor, the sensor is preferably used after first correcting the output such that the ideal characteristic is obtained.

FIG. 20 is a graph showing a correction of the characteristic of a resolver having a multiplication factor of angle Nx. Referring to FIG. 20, the horizontal axis represents the rotation angle of the resolver, and the vertical axis represents a count value that corresponds to the rotation angle. When the characteristic of the resolver is converted as it is to a digital value, the output value deviates from the ideal value. The rotation speed and the like can be correctly calculated by correcting this output value so that it matches the ideal value.

This deviation of the output value is deviation that corresponds to the positions between a mechanical angle of 0° and 360° due to machining accuracy or the like of the sensor. In other words, even if the electrical angle is the same value, the amount of deviation will differ depending on the position of the mechanical angle to which that electrical angle corresponds, so the correction value must also be changed. More specifically, when an electrical angle of 0° to 360° is a multiplication factor of angle 2×, the correction must be made after first confirming whether the output value (i.e., the electrical angle) corresponds to a mechanical angle between 0° and 180° or a mechanical angle between 180° and 360°. With a multiplication factor of angle 5×, the electrical angle indicated by the current output value could correspond to any one of five mechanical angles.

Incidentally, two-phase encoder output is used as the output of the R/D converter that converts the output of the resolver into a digital value. This two-phase encoder output includes an A-phase signal, a B-phase signal, and a Z-phase signal. The A-phase signal and the B-phase signal are signals that include pulses of a number that corresponds to the rotation angle. A phase difference is provided on the rising edge and the falling edge of the pulse between the A-phase signal and the B-phase signal, so it is possible to ascertain whether rotation is positive or negative by the phase relationship between the A-phase signal and the B-phase signal. Also, the Z-phase signal is a signal that is output once for every one rotation of electrical angle. This kind of interface is widely used in the field of motor control. With a typical two-phase encoder counter that counts by receiving two-phase encoder output, the electrical angle can be recognized but the mechanical angle cannot.

Also, there is a need for the motor itself to be made smaller, so the effects from unbalanced winding of the winding (i.e., coil) and the like increases, which tends to cause uneven rotation. In particular, at low rotation speeds, occupants are likely to feel torque ripple, so it is preferable to perform control to cancel out this torque ripple or the like with motor control. However, in this case as well, it is necessary to recognize whether the output value (i.e., the electrical angle) of the rotation detecting sensor corresponds to a mechanical angle of 0° to 180° or a mechanical angle of 180° to 360° before correcting the motor control.

SUMMARY OF INVENTION

In view of the problems described above, this invention provides a motor control apparatus that is able to recognize the position of the mechanical angle while using two-phase encoder output, and corrects a command value based on that mechanical angle.

Therefore, a first aspect of the invention relates to a motor control apparatus that includes an angle detecting portion in which an angle corresponding to one cycle of an output signal is set smaller than a mechanical angle of 360'; a counter that is configured to output a digital value corresponding to the output signal from the angle detecting portion; a position detecting portion that is configured to detect a position of the mechanical angle to which an angle indicated by the signal output from the angle detecting portion corresponds, based on a change in a count value of the counter; and a motor controlling portion that is configured to determine a current command value based on a torque command value sent from outside the motor control apparatus, and correct the current command value according to an output of the position detecting portion.

The angle detecting portion may be an electrical angle detecting portion in which an electrical angle of 360° is set smaller than a mechanical angle of 360°, and that outputs a two-phase encoder signal corresponding to an electrical angle of a rotor of a motor. The counter may be a two-phase encoder counter that counts the two-phase encoder signal and outputs a digital value corresponding to the electrical angle. The position detecting portion may be an electrical angle number detecting portion that detects a position of the mechanical angle to which an electrical angle indicated by a signal output from the electrical angle detecting portion corresponds, based on a change in a count value of the two-phase encoder counter.

Also, the motor controlling portion may determine the position of the mechanical angle to which a rotation angle of the rotor of the motor corresponds based on an output of the electrical angle number detecting portion, and perform a correction that corresponds to the rotation angle of the rotor on the current command value.

Further, the motor controlling portion may have a map that retains the torque command value and a correction coefficient corresponding to the rotation angle of the rotor, and perform the correction by multiplying the current command value by the correction coefficient.

Also, the electrical angle number detecting portion may create a count value in which a high order bit of the two-phase encoder counter is further extended to a value that corresponds to a mechanical angle of 360°, and output the extended count value.

Moreover, the electrical angle detecting portion may include a resolver in which an electrical angle of 360° is set smaller than a mechanical angle of 360°, and a resolver/digital converter that converts a signal from the resolver into a digital value. The resolver/digital converter may output the two-phase encoder signal that includes an A-phase signal, a B-phase signal, and a Z-phase signal.

Also, the two-phase encoder counter may count up or down according to the A-phase signal and the B-phase signal, and clear the count value when the Z-phase signal is input. When the count value of the two-phase encoder counter is cleared while the count value of the two-phase counter is being increased, the electrical angle number detecting portion may clear the extended count value when the count value of the two-phase encoder counter right before being cleared exceeds a threshold value.

Further, the electrical angle detecting portion may also include a sensor that detects a mechanical angle reference position. The two-phase encoder counter may count up or down according to the A-phase signal and the B-phase signal, and clear the count value according to an output of the sensor. The electrical angle number detecting portion may clear the extended count value according to the output of the sensor.

Also, the two-phase encoder counter may count up or down according to the A-phase signal and the B-phase signal, and clear the count value when the Z-phase signal is input. The motor control apparatus may also include a Z-phase abnormality detecting portion that is configured to determine whether the count value of the two-phase encoder counter when the Z-phase signal has been input is within a predetermined range corresponding to abnormal timing, and a Z-phase abnormality determining portion that is configured to count the number of times the Z-phase signal has been input when it has been determined by the Z-phase abnormality detecting portion that the count value is within the predetermined range, and clear the extended count value retained by the electrical angle number detecting portion when the number of Z-phase signals that have been input exceeds an error count threshold value.

Further, the angle detecting portion may output, as the output signal, a signal indicating that the one cycle has ended each time a predetermined angle is reached. The counter may include a rotor position detecting portion that counts up an intermediate count value from after the output signal has been input until the next output signal is input, based on a clock signal. The position detecting portion may create a count value in which a high order bit of the counter is further extended to a value that corresponds to a mechanical angle of 360°, and output the extended count value. The motor control apparatus may also include a Z-phase abnormality detecting portion that is configured to determine whether the count value of the counter when the output signal has been input is within a predetermined range corresponding to abnormal timing, and a Z-phase abnormality determining portion that is configured to count the number of times the output signal has been input when it has been determined by the Z-phase abnormality detecting portion that the count value is within the predetermined range, and clear the extended count value retained by the position detecting portion when the number of output signals that have been input exceeds an error count threshold value.

Moreover, the motor control apparatus may also include an angle correcting portion that is configured to perform a correction that corresponds to a correct position of mechanical angle on the digital value output from the counter, based on the output of the position detecting portion.

Thus, with this invention it is possible to recognize the position of the mechanical angle while using two-phase encoder output, so the motor control command value can be corrected according to the characteristic of the motor, without significantly changing the conventional control method.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
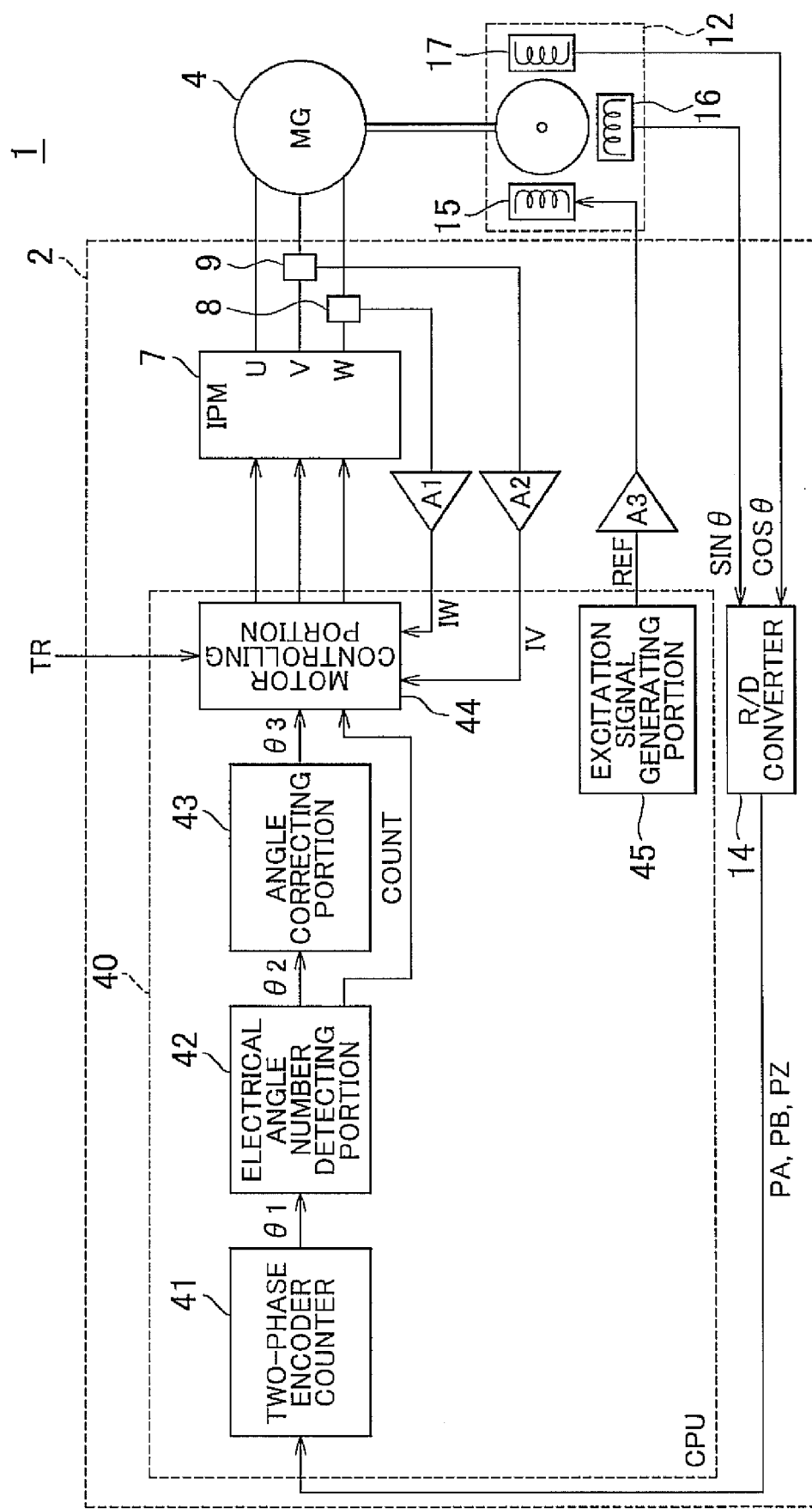
FIG. 1 is a block diagram of the structure of a vehicle to which a motor control apparatus according to a first example embodiment of the invention may be applied.

Example embodiments of the invention will be described in greater detail below with reference to the accompanying drawings. Incidentally, like or corresponding parts in the drawings will be denoted by like reference characters and descriptions of those parts will not be repeated.

FIG. 1 is a block diagram of the structure of a vehicle 1 to which a motor control apparatus according to a first example embodiment of the invention may be applied.

Referring to FIG. 1, the vehicle 1 includes an inverter apparatus 2, a motor-generator 4, and a resolver 12 that is connected to a rotor shaft of the motor-generator 4. If the vehicle 1 is an electric vehicle, a hybrid vehicle, or a fuel cell vehicle, the motor-generator 4 may be used to drive the wheels. Incidentally, the motor-generator 4 may also be used for another purpose.

Incidentally, FIG. 1 shows an example in which the resolver 12 and a R/D converter 14 are used as an electrical angle detecting portion (i.e., a rotation angle sensor) that detects the electrical angle. However, the electrical angle detecting portion is not limited to this. That is, the invention in this application may be applied as long as the electrical angle detecting portion is a device that outputs two-phase encoder output, for example, such as a rotary encoder or a variety of rotation angle sensors such as an electromagnetic rotation angle sensor or an optical rotation angle sensor. In the example described below, the electrical angle detecting portion is a resolver and an R/D converter.

The resolver 12 includes a rotor shaft in which the outer peripheral portion is shaped such that the distance to the center changes cyclically, a primary winding 15 that is provided on a stator, and two secondary windings 16 and 17 that are arranged on the stator with a phase difference of 90°. The outer shape of the rotor shaft is a shape in which the gap between the stator changes in a sine wave shape according to the angle, and the number of sine waves is determined according to the multiplication factor of angle. If a signal of a sine wave sin ωt is input to the primary winding 15 of the resolver 12, signals sin ωt sin θ and sin ωt cos θ that have been modulated according to the motor rotation angle θ are obtained by the two secondary windings 16 and 17, respectively, arranged with a phase difference of 90°.

The inverter apparatus 2 includes a CPU (Central Processing Unit) 40, an IPM (Intelligent Power Module) 7, current sensors 8 and 9, and the R/D (Resolver/Digital) converter 14. The IPM 7 includes a power switching element such as an IGBT for controlling the current that flows to the stator coil of the motor-generator 4. The stator coil of the motor-generator 4 includes a U-phase coil, a V-phase coil, and a W-phase coil. These U-, V-, and W-phase coils are Y-connected, so the U-phase current can be obtained by calculation by measuring the V- and W-phase currents using the current sensors 8 and 9, respectively.

The inverter apparatus 2 also includes amps A1 and A2 that amplify the outputs of the current sensors 8 and 9, respectively, and an amp A3 that excites the primary winding 15 of the resolver 12 based on an excitation reference signal Ref from the CPU 40.

The CPU 40 obtains a count value θ1 that corresponds to an electrical angle θe by counting the two-phase encoder signals output from the R/D converter 14. Each two-phase encoder signal includes an A-phase signal PA, a B-phase signal PB, and a Z-phase signal PZ. Further, the CPU 40 also performs counting corresponding to the multiplication factor of angle, and obtains a count value θ2 that corresponds to a mechanical angle θm. The CPU 40 calculates a value θ3 in which the characteristic variation caused by machining accuracy and the like of the resolver has been corrected based on the count value θ2, and uses this for motor control.

This kind of operation of the CPU 40 is able to be realized by either software or hardware. The CPU 40 includes a two-phase encoder counter 41, an electrical angle number detecting portion 42, an angle correcting portion 43, and a motor controlling portion 44. The two-phase encoder counter 41 counts up or down according to the A-phase signal PA and the B-phase signal PB and is cleared according to the Z-phase signal PZ. The electrical angle number detecting portion 42 both outputs the count value θ2 that corresponds to the mechanical angle and outputs an extended count value COUNT of the electrical angle, according to a change in the count value θ1 that corresponds to the electrical angle output by the two-phase encoder counter 41. The angle correcting portion 43 outputs the count value θ3 that corresponds to the electrical angle that has been corrected based on the count value θ2. The motor controlling portion 44 outputs three-phase PWM signals, i.e., a U-phase PWM signal, a V-phase PWM signal, and a W-phase signal, based on the count value θ3, the extended count value COUNT of the electrical angle, a torque command value TR, and motor current values IV and IW. The IGBT in the IPM 7 is controlled on and off, and thus the motor-generator 4 is operated, based on the three-phase PWM signals, i.e., the U-phase PWM signal, the V-phase PWM signal, and the W-phase signal.

Incidentally, the electrical angle number detected by the electrical angle number detecting portion 42 is a numerical value indicative of the position of mechanical angle to which the electrical angle corresponds. For example, the count value θ2 or the count value COUNT corresponds to electrical angle number.

The rotor shaft of the resolver 12 is mechanically coupled to the motor-generator 4. An excitation sine wave signal of 10 kHz, for example, generated by an excitation signal generating portion 45 realized by a D/A converter or the like inside the CPU 40 is amplified by the current amplifying amp A3 and applied to the primary winding 15 of the resolver 12.

The resolver 12 is a rotary transformer in which a modulated sine wave of 10 kHz, for example, is induced in the SIN winding 16 and the COS winding 17 on the secondary side as the motor-generator 4 rotates. A signal sent from the SIN winding 16 and the COS winding 17 to the R/D converter 14 is converted into a digital value by the R/D converter 14 and the two-phase encoder output signals PA, PB, and PZ are output in response to a change in this digital value.

V- and W-phase current values of the IPM 7 are detected by the current sensors 8 and 9, respectively, and applied to an A/D converting input, not shown, in the CPU 40 via the buffer amps A1 and A2, and a corresponding digital value is then output to the motor controlling portion 44.

The motor controlling portion 44 then performs a dq axis calculation based on the torque command value TR sent via communication from a host ECU (such as a hybrid ECU in a hybrid vehicle), the post-correction electrical angle θ3, and the current values IV and IW, and then determines the energizing duty by a comparison with a PWM timer.

Figure 2:
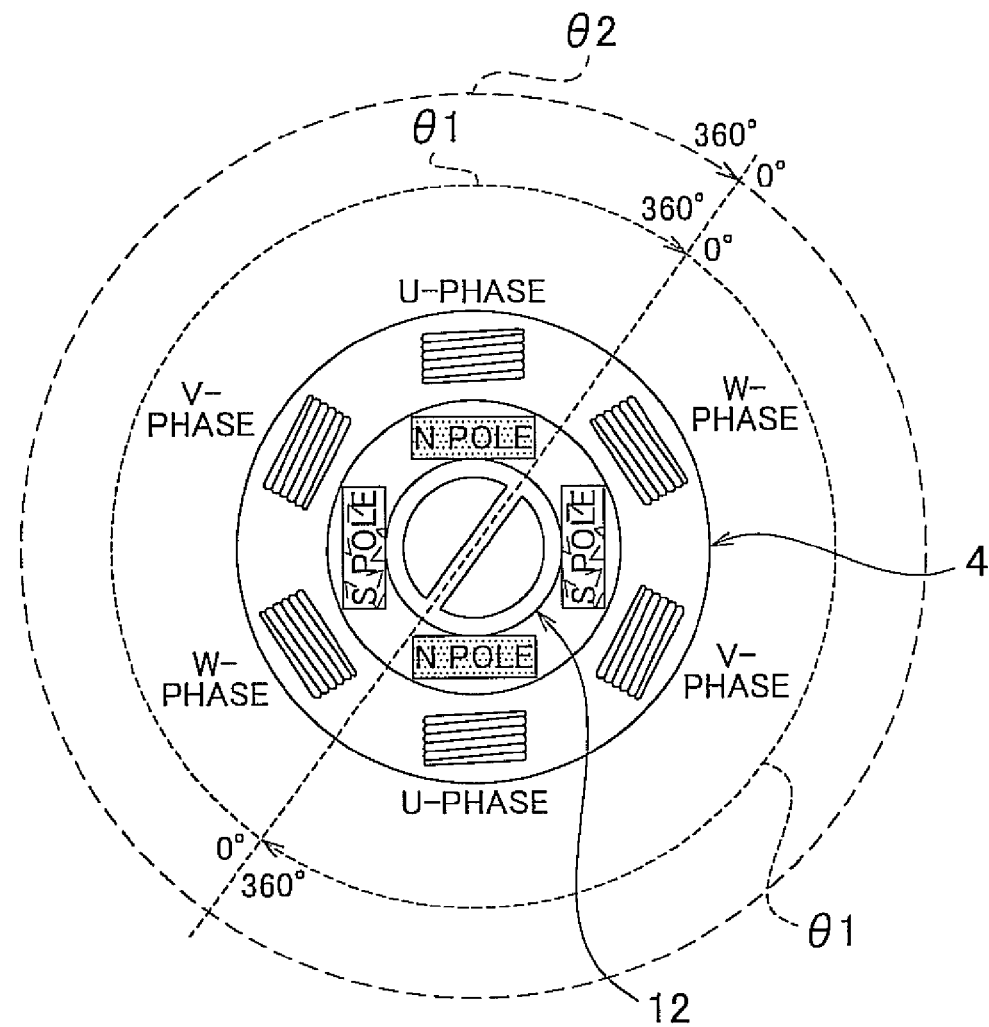
FIG. 2 is a view illustrating the multiplication factor of angle of a resolver.

FIG. 2 is a graph of the multiplication factor of angle of a resolver. An example of a resolver having a multiplication factor of angle of 2× will be described with reference to FIG. 2. As shown in FIG. 2, the resolver 12 that has a multiplication factor of angle of 2× is mounted to the motor-generator 4 having three phases and two pairs of poles. The motor-generator 4 has two U-phase coils, two V-phase coils, and two W-phase coils provided on the stator, and permanent magnets for two pairs of N and S poles provided on the rotor. The resolver 12 with a multiplication factor of angle of 2× is selected to match the two pairs of poles of the motor-generator 4. Making the selection in this manner means that only the electrical angle θe need be considered during motor control, so control is able to be simpler.

If the rotor of the motor-generator 4 is rotated one-half revolution from 0° to 180° at the mechanical angle θm, the electrical angle θe output from the resolver 12 will change from 0° to 360°. If the rotor of the motor-generator 4 is rotated another one-half revolution from 180° to 360° at the mechanical angle θm, the electrical angle θe output from the resolver 12 will change again from 0° to 360°.

Here, if the multiplication factor of angle of the resolver 12 is increased, an electrical angle signal of the same accuracy will be output unless the parts are machined with greater accuracy, so the body of the resolver 12 must be made larger. Also, if the resolver 12 is made smaller and the parts are machined with the same accuracy, the accuracy of the electrical angle signal will decrease. Therefore, it is conceivable that the output of the resolver 12 be corrected and then used.

However, in the example shown in FIG. 2, it is possible that the deviation of the resolver characteristic may be different with an electrical angle corresponding to a mechanical angle of 0° to 180° than it is with an electrical angle corresponding to a mechanical angle of 180° to 360°, because the deviation of the characteristic is caused by offset of the rotor of the resolver or machining variation of the outer periphery of the rotor or the like. For example, with a VR (Variable Reluctance) resolver that has a multiplication factor of angle of 2× and in which the rotor is machined such that the gap (i.e., distance) between the rotor and the stator changes in a sine wave (i.e., sinusoidal) shape, the accuracy may differ between a machined surface of the rotor that corresponds to a mechanical angle of 0° to 180° and a machined surface that corresponds to a mechanical angle of 180° to 360°.

Therefore, the electrical angle must be corrected according to the mechanical angle. More specifically, the correction value must be changed depending on whether the mechanical angle is 10° or 190° when correcting an output value of the same 10° electrical angle. Therefore, in the first example embodiment, the mechanical angle is obtained by extending the rotor position detecting function of the resolver according to the multiplication factor of angle.

Figure 3:
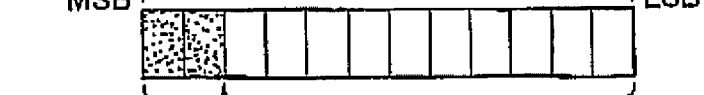
FIG. 3 is a view of bit extension of a two-phase encoder counter according to the first example embodiment.

FIG. 3 is a view of bit extension of a two-phase encoder counter according to the first example embodiment.

Referring to FIG. 3, a 10-bit counter is used as a typical two-phase encoder counter. In this case, the two-phase encoder counter 41 in FIG. 1 is a 10-bit counter. The range of electrical angle from 0° to 360° is indicated by the 10-bit count value.

The mechanical angle can be obtained by extending the high order bit of this 10-bit counter to match the multiplication factor of angle and then counting. For example, a multiplication factor of angle of 2× requires two states of 0 and 1, so one extended bit is needed. A multiplication factor of angle of 5×, for example, requires five states (000, 001, 010, 011, and 100) of 0 to 4, so three extended bits are necessary. The count corresponding to the extended bits is kept by the electrical angle number detecting portion 42 in FIG. 1.

Accordingly, the count value of a typical two-phase encoder counter is a count value θ1 that corresponds to the electrical angle θe of 0° to 360° (i.e., θe=0° to 360°. The count value of the extended counter is the count value θ2 that corresponds to the mechanical angle θm of 0° to 360° (i.e., θm=0° to 360°).

In this way, if the count value corresponding to the mechanical angle can be recognized, the deviation of the characteristic of the resolver 12 can be corrected. This correction is made by the angle correcting portion 43 in FIG. 1.

For example, this correction can be made by learning while operating the motor-generator 4. For example, the correction may be made by applying the method described in JP-A-2004-242370 to the mechanical angle. More specifically, the average rate of increase in the count value of the two-phase encoder counter in a specified period of time is obtained for the first revolution (i.e., 0° to 360°) of mechanical angle. Then in the second revolution (i.e., 0° to 360°) of mechanical angle, a predicted value of the two-phase encoder counter is calculated based on the obtained average rate of increase. If the predicted value and the actual value of the two-phase encoder counter (i.e., the actual value) fall within a predetermined range, then the predicted value is used as the post-correction value. If the predicted value and the actual value of the two-phase encoder counter fall outside of the predetermined range, then a value one-half a reference value is added to or subtracted from the actual value and the result is used as the post-correction value.

Figure 4:
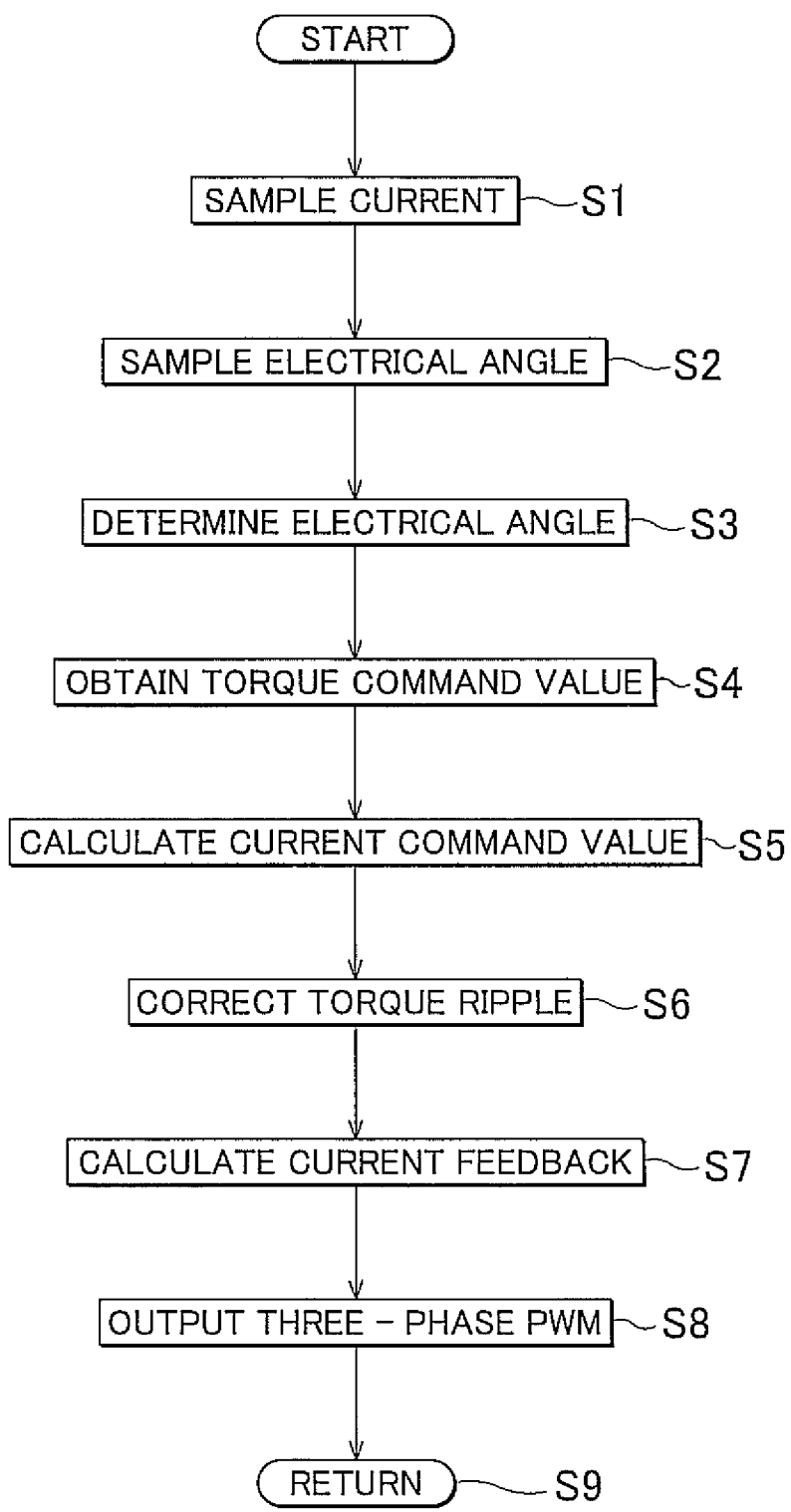
FIG. 4 is a flowchart illustrating motor control executed by an inverter apparatus in FIG. 1.

FIG. 4 is a flowchart illustrating motor control executed by the inverter apparatus 2 in FIG. 1. The routine in the flowchart shown in FIG. 4 is called up from a predetermined main routine and executed at predetermined intervals of time or every time a predetermined condition is satisfied.

Referring to FIG. 4, first when the routine starts, the current is sampled in step S1. At this time, the current values detected by the current sensors 8 and 9 are input to the motor controlling portion 44 via the amps A1 and A2, respectively.

Next, the electrical angle is sampled in step S2, and an electrical angle determination that determines what position in mechanical angle that electrical angle corresponds to is made in step S3. Here, the output of the resolver 12 is converted into a two-phase encoder signal by the R/D converter 14. Then the two-phase encoder counter 41 counts this two-phase encoder signal to obtain the count value θ1 that corresponds to the electrical angle θe. Moreover, the electrical angle number detecting portion 42 also performs a count corresponding to the multiplication factor of angle, obtains the count value θ2 corresponding to the mechanical angle θm, and outputs the count value COUNT. The angle correcting portion 43 calculates the value θ3 in which the characteristic variation caused by machining accuracy and the like of the resolver has been corrected based on the count value θ2, and the motor controlling portion 44 makes the electrical angle determination based on the value θ3 corresponding to the corrected electrical angle and the count value COUNT.

Before describing steps S4 and thereafter, the electrical angle determination will be described in detail. Steps S4 and thereafter will be described later.

Figure 5:
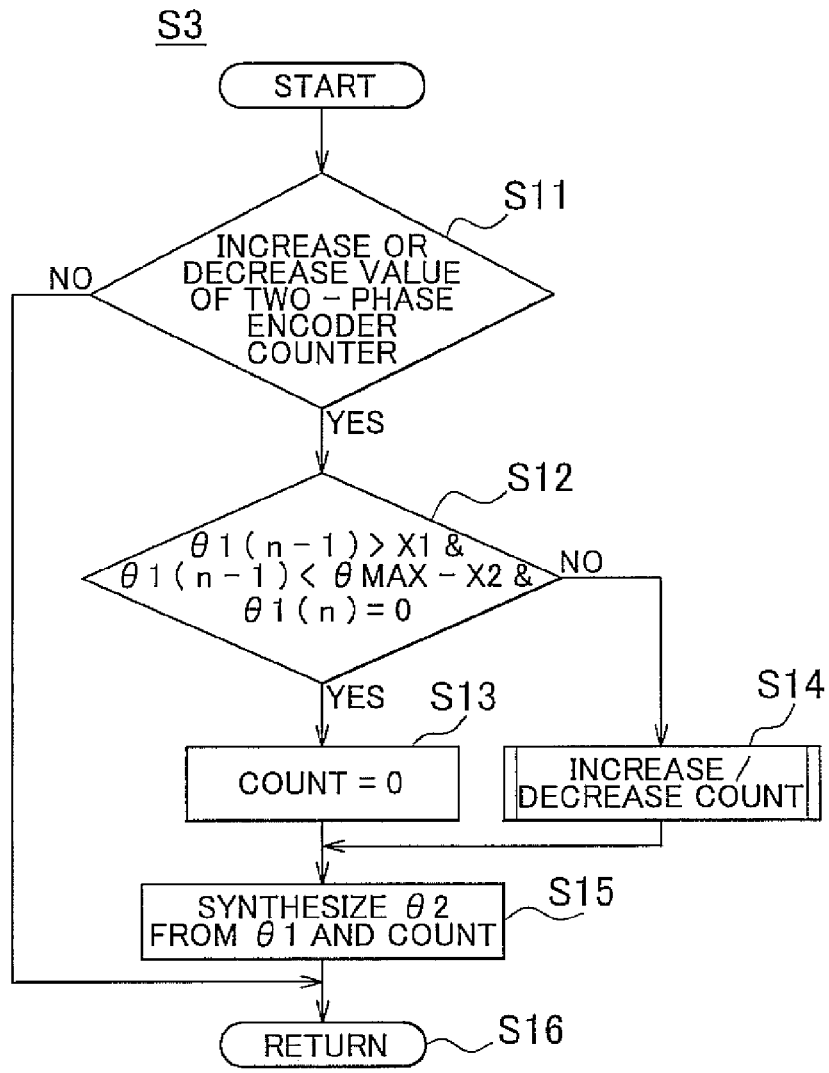
FIG. 5 is a flowchart illustrating the details of an electrical angle determining process of step S3 in FIG. 4.

FIG. 5 is a flowchart illustrating the details of the electrical angle determination in step S3 of FIG. 4.

Referring to FIG. 5, first in step S11, it is determined whether the count value of the two-phase encoder counter 41 has been increased or decreased. That is, if the count value has been changed, the process proceeds from step S11 to step S12. If the count value has not changed, the process proceeds on to step S16 and control shifts to the flowchart in FIG. 4.

In step S12, it is determined whether a condition that θ1 (n−1)>X1, and θ1 (n−1)<θMAX−X2 and θ1 (n)=0 is satisfied. Here, θ1 (n) is the count value of the two-phase encoder counter 41 of the nth cycle and is a value that corresponds to the electrical angle at a time corresponding to the nth cycle when the routine in the flowchart in FIG. 5 is executed. Also, θ1 (n−1) here is the count value of the two-phase encoder counter 41 of the nth−1 cycle and is a value that corresponds to the electrical angle at a time corresponding to the nth−1 cycle when the routine in the flowchart in FIG. 5 is executed. X1 and X2 represent threshold values, and θMAX represents the maximum value of the count value of the two-phase encoder counter 41. These will be described with reference to FIGS. 6 and 7.

Figure 6:
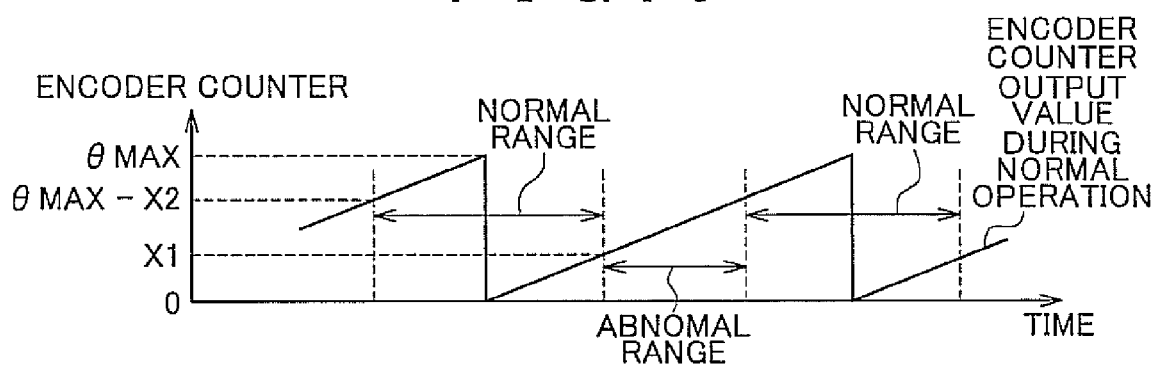
FIG. 6 is a first chart showing a process for determining whether a North Marker is normal in step S12 of FIG. 5.

FIG. 6 is a first chart showing a process for determining whether a North Marker (NM) is normal in step S12 of FIG. 5.

Figure 7:
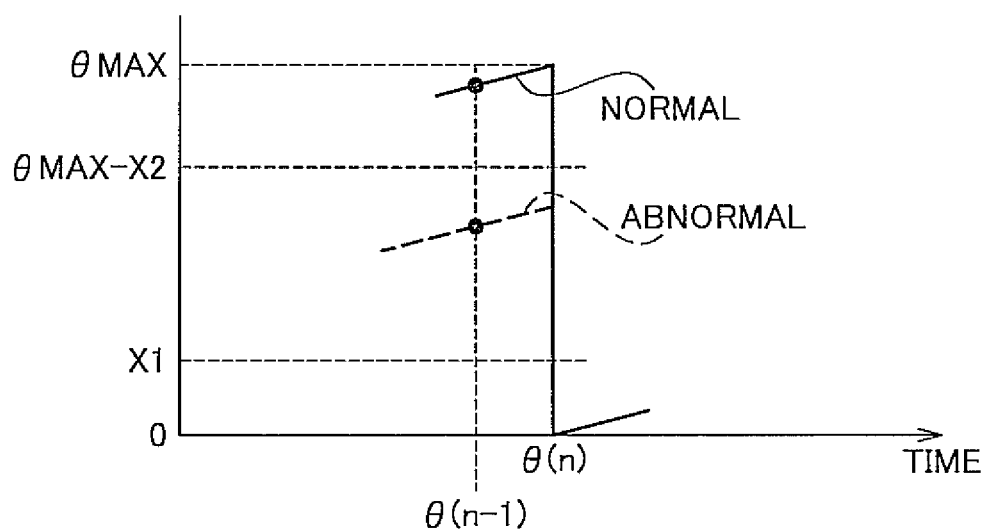
FIG. 7 is a second chart showing a process for determining whether the North Marker is normal in step S12 of FIG. 5.

FIG. 7 is a second chart showing the process for determining whether the North Marker (NM) is normal in step S12 of FIG. 5.

The count value of the encoder counter during normal operation changes like the waveform of the solid line in FIG. 6. Also, when a Z-phase signal (also referred to as a North Marker (NM)) of the two-phase encoder output is input during the process, the two-phase encoder counter 41 is reset so the value is set to 0. Once reset, the count up stops and the count value returns to 0 the next time the count value reaches the maximum value θMAX. Ordinarily, the timing at which this count value returns to 0 and the timing at which the next Z-phase signal is input are supposed to match.

However, there are cases in which the Z-phase signal is input at a timing other than when the count value θ1 of the two-phase encoder counter 41 is 0 due to a delay in the A-, B-, and Z-phase signals included in the two-phase encoder output or a signal reading error by the two-phase encoder counter 41. Even in this case, if the count value indicates a normal rotor position, the electrical angle determining operation will continue even if the timing is somewhat off. However, if the deviation exceeds a threshold value, it is determined that the count value θ1 of the two-phase encoder counter 41 is not correctly indicating the rotor position, so the electrical angle determining operation is also initialized.

As shown in FIG. 6, a normal range is set straddling the normal timing of the Z-phase signal, and any other timing falls in an abnormal range. If the Z-phase signal is input in the abnormal range, the count value COUNT is cleared. Also, the count value θ1 of the two-phase encoder counter 41 is also cleared when the Z-phase signal is input.

Accordingly, as shown in FIG. 7, when the change history of the count value θ1 of the two-phase encoder counter 41 is retained for a fixed period of time and the count value becomes 0 at time θ (n), the last count value θ1, i.e., the count value θ1 at time θ (n−1), is determined to be abnormal if it falls between X1 and θMAX−X2. Also, the count value θ1 at time θ (n−1) is determined to be normal if it falls between 0 and X1 or between θMAX−X2 and θMAX. Incidentally, the threshold values X1 and X2 may be different values or the same value.

Referring back to FIG. 5 again, if the condition of step S12 is satisfied, the process proceeds on to step S13 where the count value COUNT is set to 0. If, on the other hand, the condition of step S12 is not satisfied, the process proceeds on to step S14 where the count value COUNT is increased or decreased. The details of this increase or decrease will be described later with reference to FIG. 8.

Once the count value COUNT has finished being updated in step S13 or S14, a count value θ2 that corresponds to the mechanical angle θm is synthesized from the count value θ1 of the two-phase encoder counter 41 and the count value COUNT corresponding to the extended bit in step S15. Then in step S16, control returns to the routine in the flowchart shown in FIG. 4.

Figure 8:
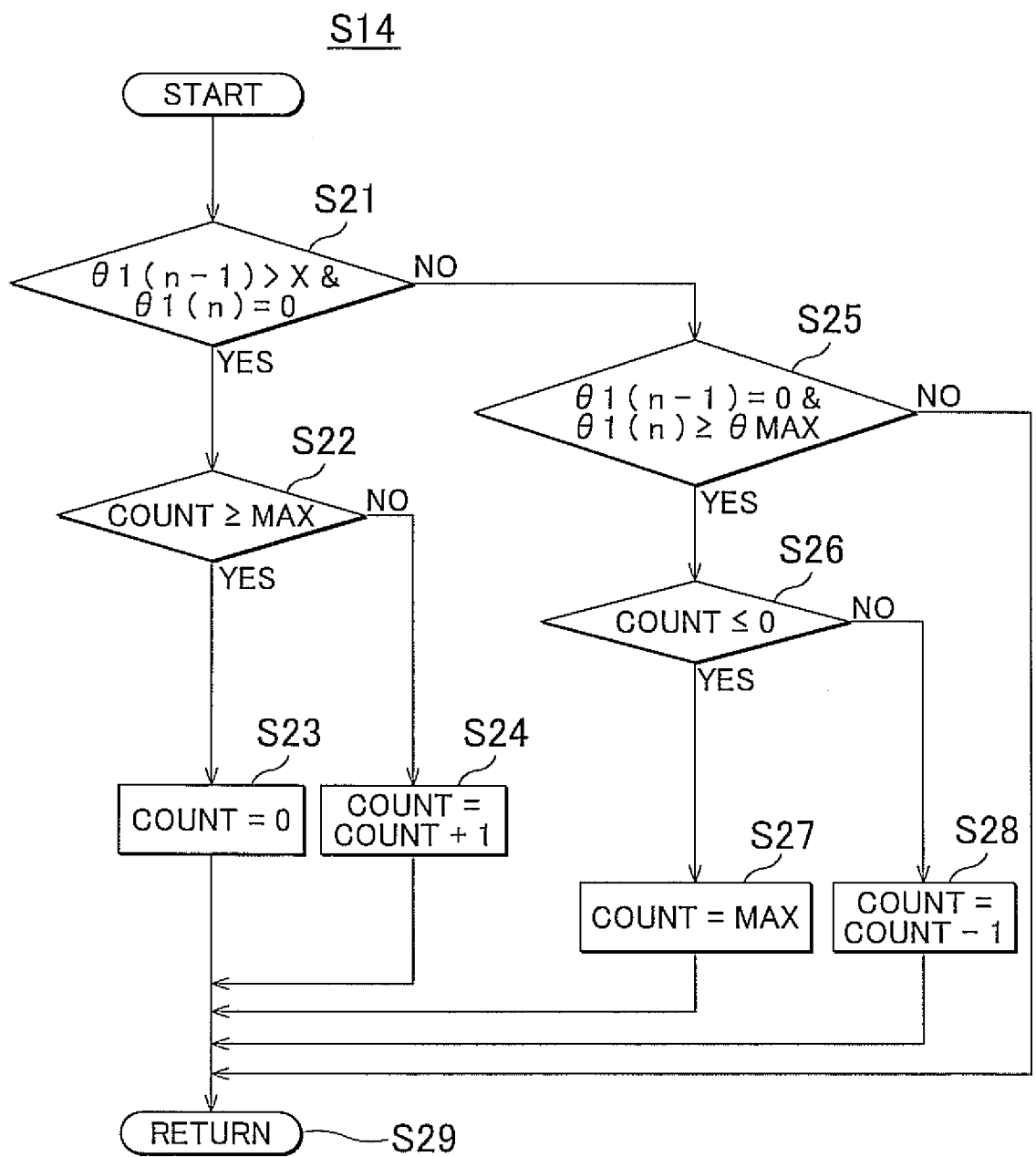
FIG. 8 is a flowchart showing a process for increasing and decreasing an extended bit of the two-phase encoder counter executed in step S14 of FIG. 5.

FIG. 8 is a flowchart illustrating the process of increasing or decreasing the extended bit of the two-phase encoder counter that is executed in step S14 of FIG. 5. This process corresponds to the process executed in the electrical angle number detecting portion 42 in FIG. 1.

First, it is determined in step S21 whether the condition that θ1 (n−1)>X and θ1 (n)=0 is satisfied. Here, θ1 (n) is the count value of the two-phase encoder counter 41 of the nth cycle and is a value that corresponds to the electrical angle at a time corresponding to the nth cycle when the routine in the flowchart in FIG. 8 is executed. Also, θ1 (n−1) here is the count value of the two-phase encoder counter 41 of the nth−1 cycle and is a value that corresponds to the electrical angle at a time corresponding to the nth−1 cycle when the routine in the flowchart in FIG. 8 is executed. X represents a threshold value. This threshold value X will be described later with reference to FIG. 10.

The condition in step S21 is used to determine whether, when the Z-phase signal is input to the two-phase encoder counter 41 and the count value θ1 (n) has been cleared to zero, the count value θ1 (n−1) one cycle earlier is greater than the threshold value X. If this condition is satisfied, the process proceeds from step S21 to step S22. In this case, the two-phase encoder counter 41 is cleared while it is being counted up, so here the extended bit must be counted up.

In step S22, it is determined whether the count value COUNT of the extended bit is equal to or greater than the maximum value MAX that corresponds to the multiplication factor of angle (or the electrical angle number). This maximum value MAX is, for example, 1 with a 1-bit binary number if the resolver has a multiplication factor of angle of 2× (or if the motor has two pairs of poles), and 100 with a 3-bit binary number if the resolver has a multiplication factor of angle of 5× (or if the motor has five pairs of poles).

If in step S22 the count value COUNT is equal to or greater than the maximum value MAX, the process proceeds on to step S23 where the count value COUNT is set to 0. If, on the other hand, the count value COUNT has not reached the maximum value MAX, the process proceeds on to step S24 where 1 is added to the count value COUNT and the bit extension portion in FIG. 3 is counted up.

If the condition in step S21 is not satisfied, the process proceeds on to step S25. In step S25 it is determined whether the condition that θ1 (n−1)=0 and θ1 (n)≧θMAX is satisfied. Here, θ1 (n) is the count value of the two-phase encoder counter 41 of the nth cycle and is a value that corresponds to the electrical angle at a time corresponding to the nth cycle. Also, θ1 (n−1) here is the count value of the two-phase encoder counter 41 of the nth−1 cycle and is a value that corresponds to the electrical angle at a time corresponding to the nth−1 cycle. θMAX is the count value of the two-phase encoder counter 41 that corresponds to the maximum value of the electrical angle.

The condition of step S25 is used to determine whether, when the Z-phase signal is input to the two-phase encoder counter 41 and the count value θ1 (n−1) has been cleared to zero, the count value θ1 (n) one cycle later is greater than θMAX. If this condition is satisfied, the process proceeds from step S25 to step S26. In this case, the two-phase encoder counter 41 is counted down after being cleared to zero, so here the count value COUNT of the extended bit must be counted down.

In step S26 it is determined whether the count value COUNT of the extended bit is equal to or less than zero. If in step S26 the count value COUNT is equal to or less than zero, the process proceeds on to step S27 where the count value COUNT is set equal to MAX. If, on the other hand, the count value COUNT is greater than zero, the process proceeds on to step S28 where 1 is subtracted from the count value COUNT and the extended bit portion in FIG. 3 is counted down.

After step S23, S24, S27, or S28 has been executed, the process proceeds on to step S29. In step S29, the process shifts to the routine in the flowchart in FIG. 5.

Then in step S15 of FIG. 5, the extended count value θ2 corresponding to the mechanical angle θm as described with reference to FIG. 3 is synthesized from θ1 that is the output value of the two-phase encoder counter 41, and the count value COUNT corresponding to the extended bit.

Figure 9:
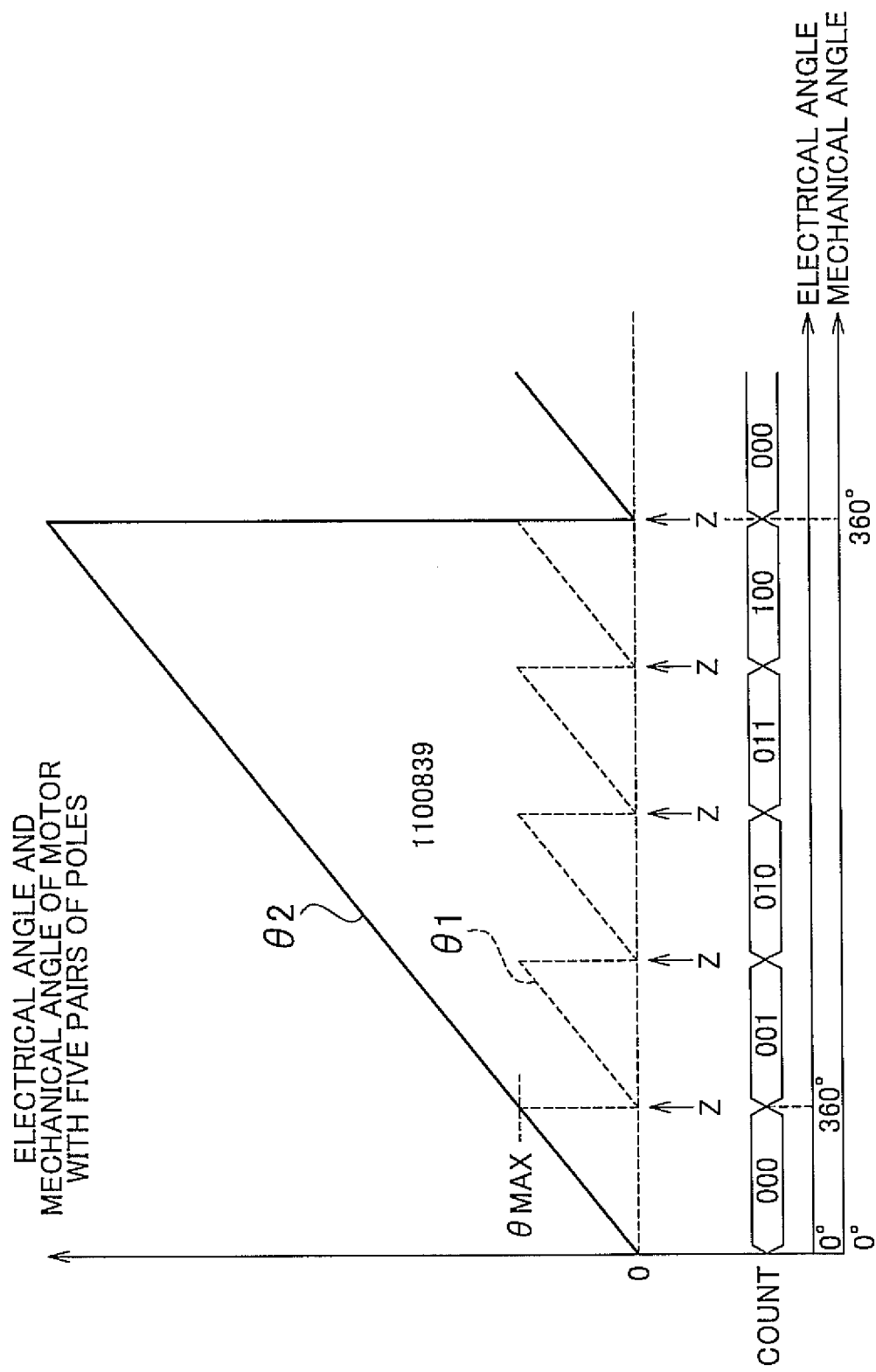
FIG. 9 is a waveform diagram of one example of a change in the count value of the counter with respect to changes in the electrical angle and the mechanical angle when a motor with five pairs of poles is used.

FIG. 9 is a waveform diagram of one example of a change in the count value of the counter with respect to changes in the electrical angle and the mechanical angle when a motor with five pairs of poles is used.

Referring to FIG. 9, the horizontal axis represents the mechanical angle (0° to 360°). The count value COUNT is counted up each time the electrical angle changes from 0° to 360°. The count value θ1 corresponding to the electrical angle repeatedly changes from zero to θMAX. When the electrical angle reaches 360°, the Z-phase signal is input and the counter value θ1 that has reached θMAX is cleared to zero. At this time, 1 is added to the count value COUNT corresponding to the extended bit (step S24 in FIG. 8).

In this way, every time the Z-phase signal is input, the count value θ1 is cleared to zero, and the count value COUNT is counted up in binary numbers from 000→001→010→011→100. With the angle of the motor with five pairs of poles, MAX in the flowchart in FIG. 8 is 100, so the count value COUNT is cleared to 000 when the next Z-phase signal is input after COUNT=100 (i.e., step S23).

FIG. 9 also shows that the count value θ2 corresponding to the mechanical angle is obtained based on the count value θ1 and the count value COUNT.

Figure 10:
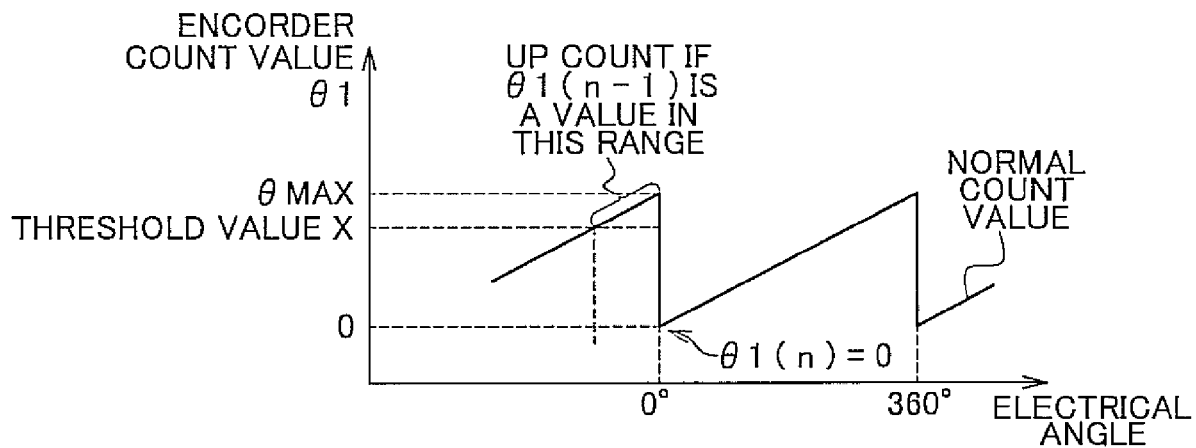
FIG. 10 is an enlarged waveform diagram of the change in the count value during a counter increase before and after a North Marker.

FIG. 10 is an enlarged waveform diagram of the change in the count value during a counter increase before and after a North Marker. The Z-phase signal of the two-phase encoder output may also be referred to as a North Marker (NM). In FIG. 9, θ1 changes to θMAX and the COUNT value is increased when θ1 changes to zero immediately thereafter. However, the timing at which the Z-phase signal is output may be off, so a process is performed to allow for a certain amount of offset.

The threshold value X in step S21 of FIG. 8 is shown in FIG. 10. According to the condition of step S21, if θ1 exceeds the threshold value X, the count value COUNT is counted up even if the count value has not been counted up to θMAX. That is, θ1 (n) becomes equal to zero when the Z-phase signal is input to the two-phase encoder counter 41 in FIG. 1, or when the two-phase encoder counter 41 reaches the maximum value θMAX and the next addition is made based on a change in the A- and/or B-phase signals.

By performing the process in step S21, even if the Z-phase signal ends up being input before the maximum value θMAX is reached, the count value COUNT is able to be counted up as appropriate for that time. As a result, the count value θ2 that correctly corresponds to the mechanical angle can be obtained.

Therefore, the position of the mechanical angle is able to be recognized while also using the two-phase encoder output, so the characteristic of the motor or rotation angle sensor can be corrected or the like without significantly changing the conventional control method.

Step S4 and thereafter will now be described referring back to FIG. 4 again. When the electrical angle determination in step S3 ends, a process to obtain a torque command value is performed in step S4. The torque command value TR is determined based on the accelerator operation amount and the like by the host ECU (such as a hybrid ECU in a hybrid vehicle) and output via communication. The motor controlling portion 44 in FIG. 1 receives this torque command value TR. Next, a process to calculate the current command value is performed in step S5. When the direct-current (DC) power supply voltage of the IPM in FIG. 1 is being variably controlled, the DC power supply voltage is obtained and the rotation speed of the motor-generator 4 is calculated based on the change in θ3. The current command value is then calculated based on the torque command value, the DC power supply voltage, and the rotation speed.

Next in step S6, a torque ripple correction is performed on the current command value obtained in step S5. Torque ripple is pulsation in the torque that is easily felt when running at low speeds in particular. Torque ripple often appears cyclically.

Figure 11:
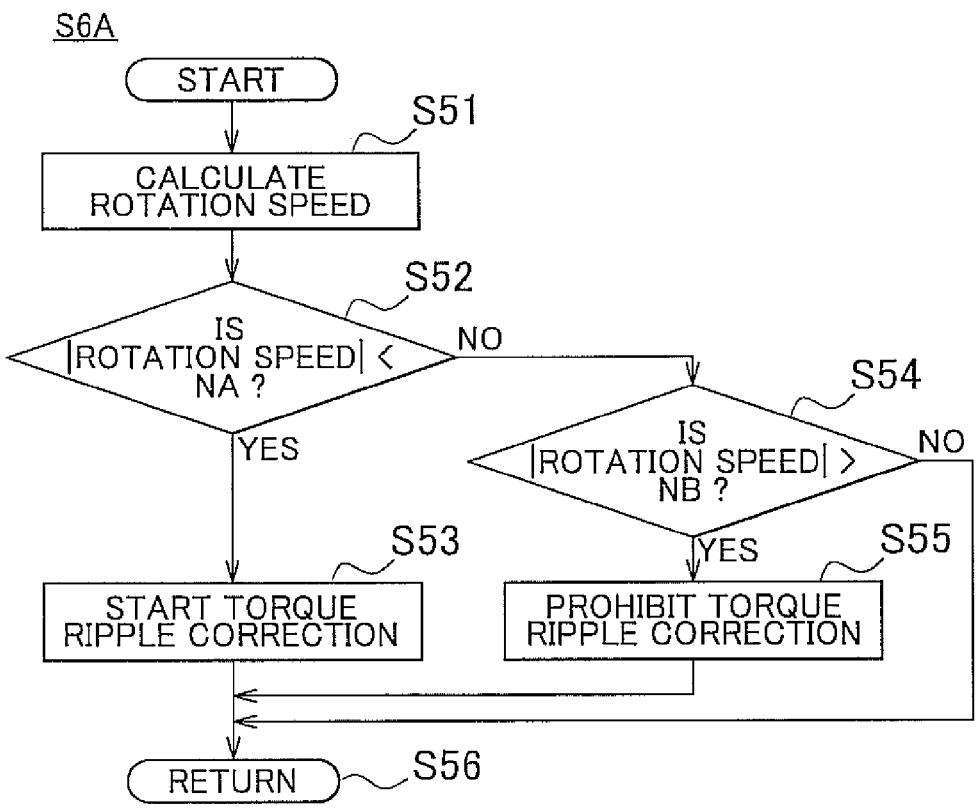
FIG. 11 is a first flowchart illustrating the details of a torque ripple correction in step S6 of FIG. 4.

FIG. 11 is a first flowchart illustrating the details of the torque ripple correction in step S6 of FIG. 4.

The flowchart in FIG. 11 shows a step S6A in the process of step S6, that reverses the starting and prohibiting of the torque ripple correction.

First in step S51, the rotation speed of the motor-generator 4 is calculated. Then in step S52, it is determined whether the absolute value of the rotation speed is less than a threshold value NA. If the rotation speed is less than the threshold value NA, it means that the vehicle is traveling at a low speed and torque ripple will become a problem, so the process proceeds on to step S53. The threshold value NA may be set at 50 rpm, for example. In step S53 a determination is made to start a torque ripple correction.

If the absolute value of the rotation speed is not less than the threshold value NA in step S52, the process proceeds on to step S54.

In step S54, it is determined whether the absolute value of the rotation speed is greater than a threshold value NB. If the absolute value of the rotation speed is greater than the threshold value NB, it means that the vehicle is traveling at a high speed and there is other vibration and the like so torque ripple will not stand out, and moreover, a short processing time is required, so a correction is not made. Thus, the process proceeds from step S54 to step S55 where a determination is made to prohibit the torque ripple correction. Incidentally, if the absolute value of the rotation speed is not greater than the threshold value NB in step S54, a torque ripple correction is neither started nor prohibited. Instead, the current state is maintained. That is, if a torque ripple correction is in the process of being made, that correction is continued, but if a torque ripple correction is not being made, that state is maintained.

In this way, a correction is either made or not made depending on which step, i.e., step S53 or S55, is executed. If the determination in step S54 is NO, the current state is maintained and the process proceeds on to step S56.

Figures 12, 13:
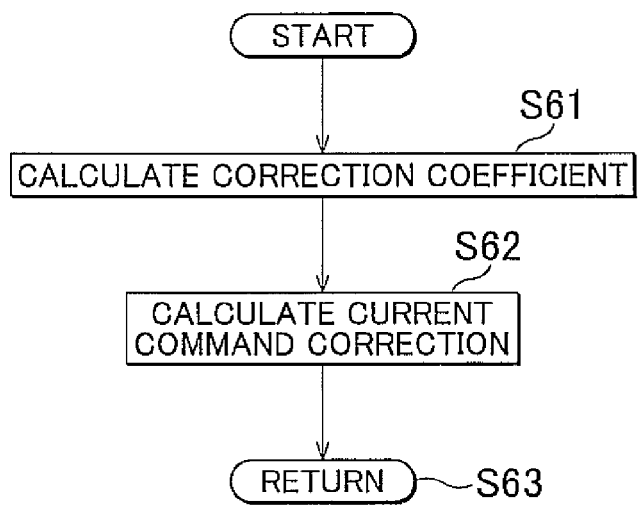
FIG. 12 is a second flowchart illustrating the details of the torque ripple correction in step S6 of FIG. 4.
FIG. 13 is a view of one example of a correction coefficient map used in the torque ripple correction.

FIG. 12 is a second flowchart illustrating the details of the torque ripple correction in step S6 of FIG. 4.

FIG. 13 is a view of one example of a correction coefficient map used in the torque ripple correction.

The routine in the flowchart in FIG. 12 is a current correcting step S6B that is executed from the time a determination is made to start a torque ripple correction until a determination is made to prohibit a torque ripple correction in step S6A in FIG. 11.

Referring to FIGS. 12 and 13, first a correction coefficient is calculated in step S61. In the calculation process of this correction coefficient, a correction coefficient corresponding to the mechanical angle is obtained by linearly interpolating a correction coefficient stored in the map in FIG. 13 in the mechanical angle direction and then further linearly interpolating it in the torque direction.

In the map in FIG. 13, the relationship between the mechanical angle and the correction coefficient is defined with respect to each torque command value TR=20 (N·m), 40 (N·m), . . . 200 (N·m). Incidentally, the mechanical angle is obtained by multiplying the COUNT by θ3 (i.e., COUNT× θ3) in FIG. 1.

Continuing on, a process for calculating a correction of the current command is performed in step S62. More specifically, a post-correction d-axis current command value and q-axis current command value are obtained by multiplying a coefficient obtained by interpolating the map in FIG. 13 by a current command value calculated based on the torque command value, the DC power supply voltage, and the rotation speed in step S4 of FIG. 4. After the correction of the current command has been calculated in step S62, then in step S63 control returns again to the flowchart in FIG. 4 and step S7 is executed.

In step S7, a current feedback calculation process is performed to approach the current command value for which the measurement results of the current values measured by the current sensors 8 and 9 had been corrected.

Then a three-phase voltage command value after the three-phase conversion process is calculated in step S8, and three-phase PWM switching output is executed using a carrier frequency.

As described above, in the first example embodiment, the position of the mechanical angle can be recognized while also using the two-phase encoder output, so it is possible to correct the characteristic of the rotation angle sensor without significantly changing the conventional control method. Moreover, in addition to correcting the characteristic of the rotation angle sensor, it is also possible to apply a correction to motor control for improving torque ripple and the like. Incidentally, it is also possible to correct only the motor control and not correct the rotation angle sensor.

Next a second example embodiment of the invention will be described. With a resolver having a multiplication factor of angle of 2×, for example, the electrical angle changes from 0° to 360° twice for each one revolution from 0° to 360° of mechanical angle. The first example embodiment can be used when all that is necessary is to distinguish the first electrical angle from the second electrical angle and perform a correction according to these, such as when the accuracy can be learned and corrected during rotation. Thus it is not necessary to ascertain the absolute position of the mechanical angle.

However, it is conceivable that there may be a case in which correction data is created using accurate measuring equipment in a factory or the like beforehand, but that accurate measuring equipment is not included in the product itself to be shipped. In this case, if the correction data is to be applied to the shipped product, the mechanical angle when the correction data is created must be correctly correspond to that shipped product. That is, the mechanical angle when the correction data is created must match the mechanical angle when the correction data is used.

This is the case not only with the correction data of the rotation angle sensor, but also when correcting the current command value of the motor control.

Figure 14:
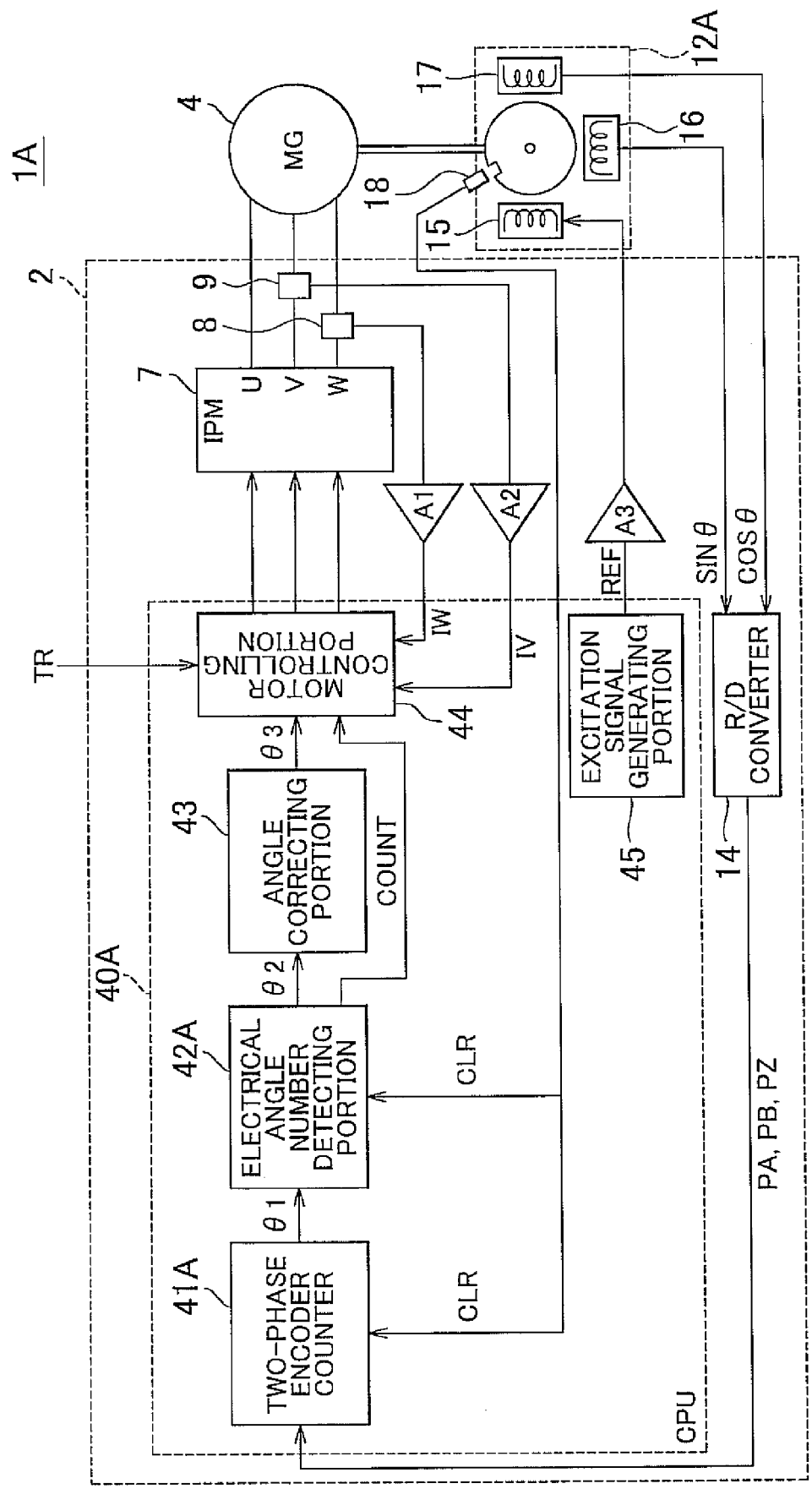
FIG. 14 is a block diagram of a vehicle in which a motor control apparatus according to a second example embodiment of the invention is used.

FIG. 14 is a block diagram of a vehicle 1A in which a motor control apparatus according to the second example embodiment of the invention is used. Referring to FIG. 14, the vehicle 1A differs from the vehicle 1 in FIG. 1 in that it includes a resolver 12A and a CPU 40A instead of the resolver 12 and the CPU 40. The other structure of the vehicle 1A is the same as that of the vehicle 1 described above, so a description thereof will not be repeated.

The resolver 12A includes a sensor 18 for detecting the position of 0° mechanical angle of the rotor and outputting a clear signal CLR. The primary coil 15 and the secondary coils 16 and 17 are the same as in FIG. 1, so the descriptions thereof will not be repeated.

The CPU 40A differs from the CPU 40 in FIG. 1 in that it includes a two-phase encoder counter 41A and an electrical angle number detecting portion 42A instead of the electrical angle number detecting portion 42. The other structure of the CPU 40A is the same as that of the CPU 40 so a description thereof will not be repeated.

The two-phase encoder counter 41A counts up or down according to the A-phase signal PA and the B-phase signal PB, and is cleared to zero based on the clear signal CLR instead of the Z-phase signal PZ. Incidentally, the structure may also be such that the two-phase encoder counter 41A is cleared when either the Z-phase signal PZ or the clear signal CLR is input.

The electrical angle number detecting portion 42A both outputs a count value θ2 that corresponds to the mechanical angle and outputs an extended count value COUNT of the electrical angle, according to a change in the count value θ1 that corresponds to the electrical angle output from the two-phase encoder counter 41A. Then when the clear signal CLR is input, the electrical angle number detecting portion 42A clears the count value θ2 and the count value COUNT to zero.

Figure 15:
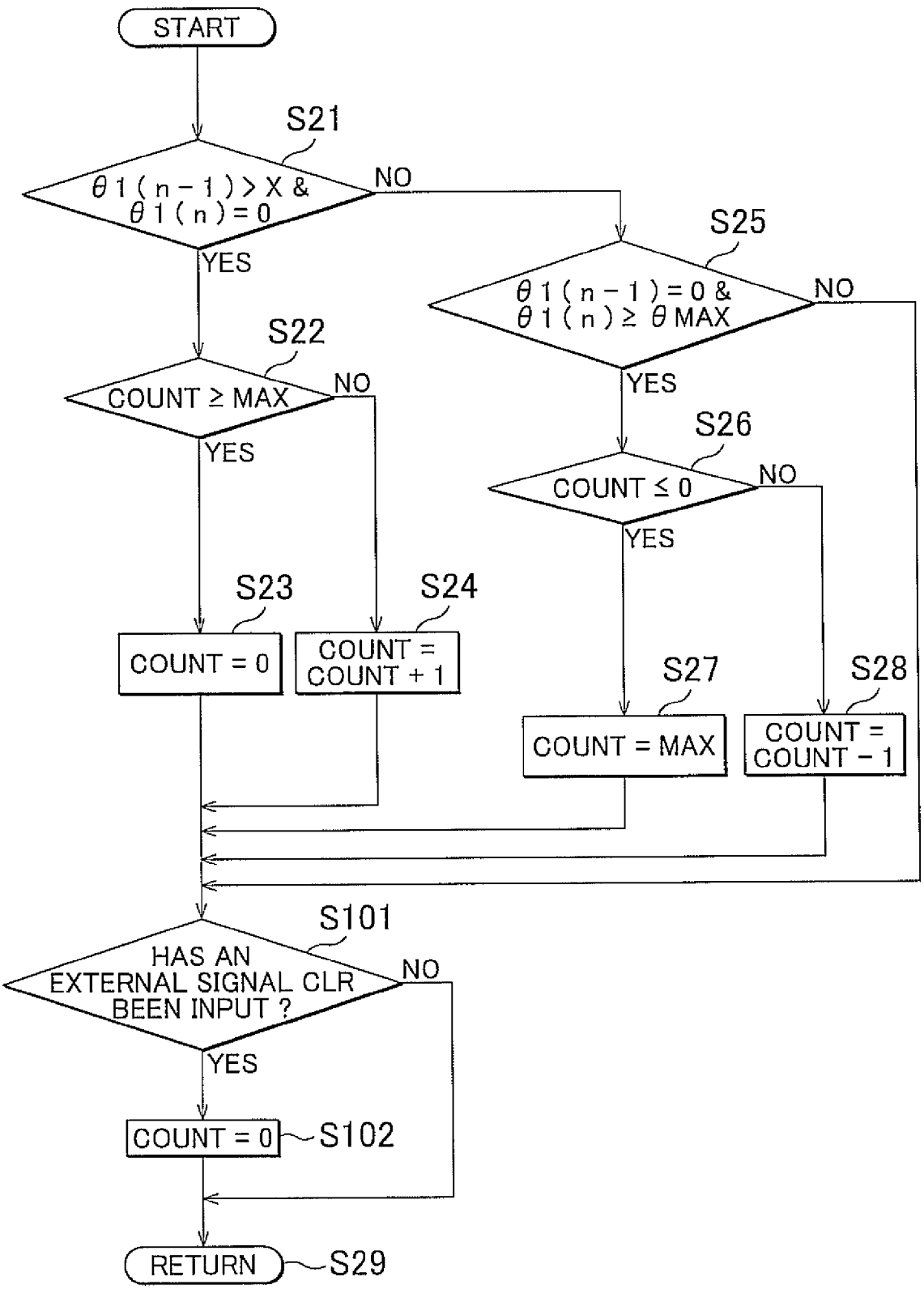
FIG. 15 is a flowchart illustrating count control of an extended bit of a two-phase encoder counter executed by a CPU in the second example embodiment.

FIG. 15 is a flowchart illustrating count control of an extended bit of the two-phase encoder counter 41A executed by the CPU 40A in the second example embodiment.

The flowchart in FIG. 15 is the same as the flowchart in FIG. 8 with the addition of steps S101 and S102. As steps S21 to S28 are the same as described above with reference to FIG. 8, descriptions of these steps will not be repeated.

When any of steps S23, S24, S27, and S28 ends and the count value COUNT is temporarily determined, the process proceeds on to step S101. In step S101, it is determined whether a clear signal CLR has been input from the sensor 18. If no clear signal CLR has been input, the count value COUNT is applied as it is to step S15 of FIG. 5. If, on the other hand, a clear signal CLR has been input, the count value COUNT is cleared to zero in step S102 and then the process proceeds on to step S29.

After the control shifts to the flowchart in FIG. 5 in step S29, the extended count value θ2 that corresponds to the mechanical angle θm as described with reference to FIG. 3 is synthesized in step S15 from θ1 that is the output value of the two-phase encoder counter 41A and the count value COUNT that corresponds to the extended bit.

The rotation angle detecting apparatus described in this second example embodiment is able to obtain the absolute position of the mechanical angle from the two-phase encoder output of the rotation angle sensor. Therefore, even if the correction data of the rotation angle sensor is created at a factory or the like, it is able to be applied to the correct position, so an even more accurate rotation angle sensor can be realized.

Furthermore, in addition to the correction of the characteristic of the rotation angle sensor, even if the correction data for motor control to improve torque ripple and the like is created at a factory or the like, it is able to be applied to the correct position, so even more accurate motor control can be realized. Incidentally, it is possible to correct only the motor control and not correct the rotation angle sensor.

Also, in the first and second example embodiments described above, the resolver and the R/D converter are used as the electrical angle detecting portion (i.e., the rotation angle sensor) that detects the electrical angle. However, the electrical angle detecting portion is not limited to this. That is, the invention in this application may be applied as long as the electrical angle detecting portion is, for example, any one of a variety of rotation angle sensors such as an electromagnetic rotation angle sensor or an optical rotation angle sensor, and a device that outputs two-phase encoder output such as a rotary encoder.

The first example embodiment described above will now be summarized referring to FIG. 1 and the like again. Incidentally, with the exception of the reference characters, this summary also applies to the second example embodiment with reference to FIG. 8 and the like. The motor control apparatus of these example embodiments includes i) the electrical angle detecting portion (i.e., the resolver 12 and the R/D converter 14) in which an electrical angle of 360° is set smaller than a mechanical angle of 360° and that outputs a two-phase encoder signal corresponding to the electrical angle of the rotor of the motor, ii) the two-phase encoder counter 41 that counts the two-phase encoder signals and outputs a digital value corresponding to the electrical angle, iii) the electrical angle number detecting portion 42 that detects the position of mechanical angle to which the electrical angle indicated by the signal output from the electrical angle detecting portion corresponds, and iv) the motor controlling portion 44 that determines the current command value based on the torque command value TR, and corrects the current command value according to the output of the electrical angle number detecting portion 42.

Preferably, the motor controlling portion 44 determines, based on the output of the electrical angle number detecting portion 42, the position of mechanical angle to which the rotation angle of the rotor of the motor-generator 4 corresponds, and performs a correction corresponding to the rotation angle of the rotor on the current command value.

More preferably, the motor controlling portion 44 has a map that retains the torque command value TR and a correction coefficient corresponding to the rotation angle of the rotor, and performs a correction by multiplying the current command value by the correction coefficient.

Preferably, the electrical angle number detecting portion 42 creates a count value COUNT in which the high order bit of the two-phase encoder counter is further extended to a value that corresponds to a mechanical angle of 360°, and outputs that extended count value COUNT.

More preferably, the electrical angle detecting portion includes the resolver 12 in which an electrical angle of 360° is set smaller than a mechanical angle of 360°, and a resolver/digital (R/D) converter 14 that converts the signal from the resolver 12 into a digital value, and the R/D converter 14 outputs a two-phase converter signal that includes an A-phase signal, a B-phase signal, and a Z-phase signal.

Even more preferably, the two-phase encoder counter 41 counts up or down according to the A-phase signal and the B-phase signal, and clears the count value when the Z-phase signal is input. As shown in FIGS. 8 and 10, when the count value θ1 of the two-phase encoder counter 41 is cleared while the count value of the two-phase encoder counter 41 is being increased, the electrical angle number detecting portion 42 clears the extended count value COUNT when the count value θ1 of the two-phase encoder counter 41 right before being cleared has exceeded a threshold value X.

More preferably, the electrical angle detecting portion also includes the sensor 18 that detects a reference position of the mechanical angle. The two-phase encoder counter 41A counts up or down according to the A-phase signal and the B-phase signal, and clears the count value θ1 in response to an output from the sensor 18. The electrical angle number detecting portion 42A clears the extended count value COUNT in response to output from the sensor 18.

Preferably, the motor control apparatus also includes an angle correcting portion 43 that performs a correction corresponding to the correct position of mechanical angle on the digital value output by the two-phase encoder counter based on the output of the electrical angle number detecting portion 42.

Next, a third example embodiment of the invention will be described. The motor control apparatus described in the first example embodiment receives the Z-phase signal, the A-phase signal, and the B-phase signal output from the position detector (i.e., the resolver+R/D converter or encoder and the like) and determines the electrical angle number. However, when a Z-phase signal is input unexpectedly for some reason, the electrical angle number is unable to be determined correctly. For example, if the Z-phase signal is input at a timing that is no near a resolver angle of 0 degrees, the two-phase encoder counter will be cleared and it may be erroneously determined that the electrical angle is the next electrical angle.

Therefore, in the third example embodiment, when a Z-phase signal is generated unexpectedly with respect to a resolver angle obtained from the A-phase signal and the B-phase signal, that Z-phase signal is ignored. Also, when a Z-phase signal is continuously generated unexpectedly, the electrical angle is detected again.

Figure 16:
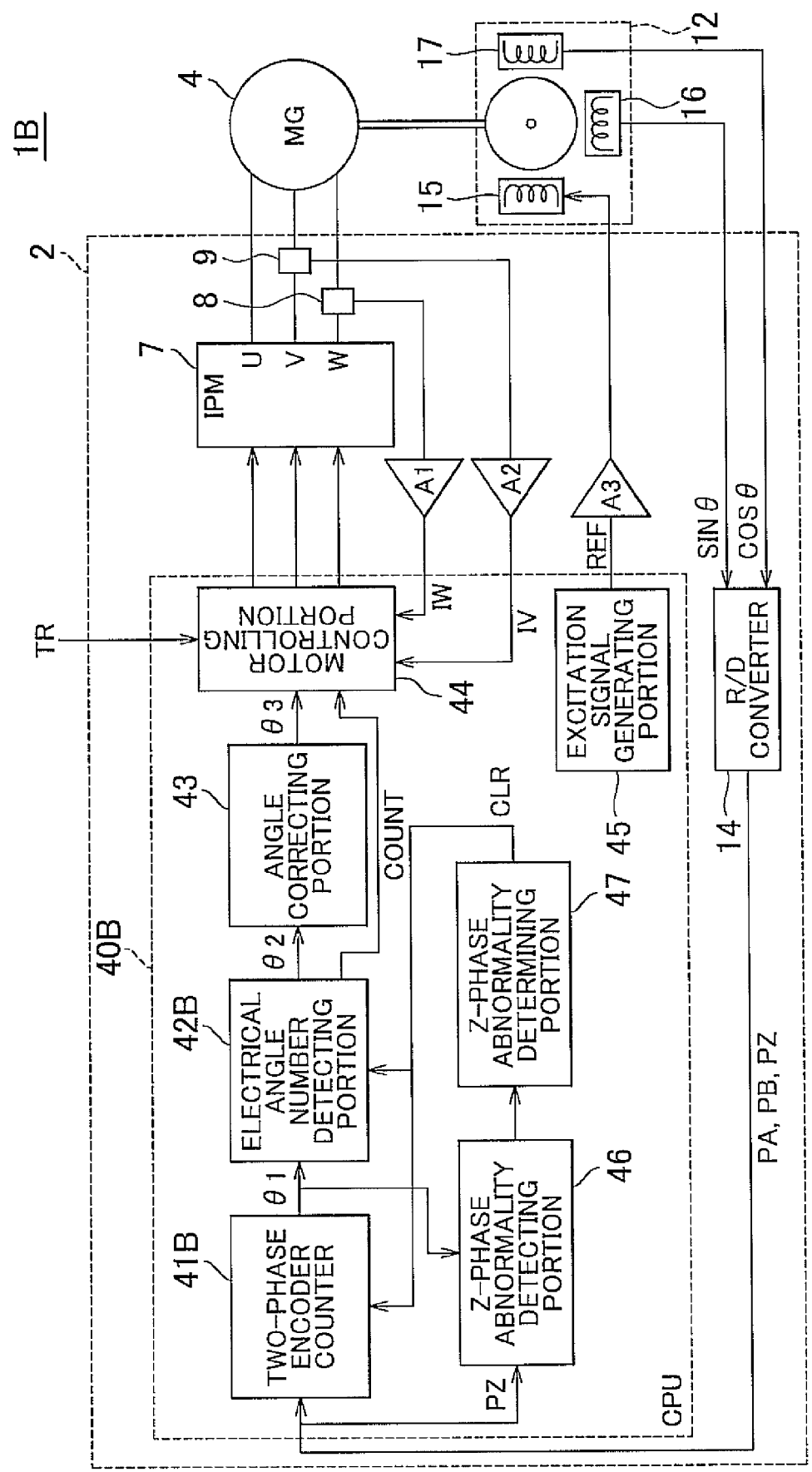
FIG. 16 is a block diagram of a vehicle in which a motor control apparatus according to a third example embodiment of the invention is used.

FIG. 16 is a block diagram of a vehicle 1B in which a motor control apparatus according to the third example embodiment is used. Referring to FIG. 16, vehicle 1B is structured such that the inverter apparatus 2 includes a CPU 40B instead of the CPU 40 in the vehicle 1 shown in FIG. 1. The other structure of the vehicle 1B is the same as that of the vehicle 1 described above, so a description thereof will not be repeated.

The CPU 40B differs from the CPU 40 shown in FIG. 1 in that it includes a two-phase encoder counter 41B and an electrical angle number detecting portion 42B instead of the two-phase encoder counter 41 and the electrical angle number detecting portion 42, and also includes a Z-phase abnormality detecting portion 46 and a Z-phase abnormality determining portion 47. The other structure of the CPU 40B is the same as that of the CPU 40, so a description thereof will not be repeated.

The two-phase encoder counter 41B counts up or counts down the count value θ1 according to the A-phase signal PA and the B-phase signal PB, and clears the count value θ1 according to the Z-phase signal PZ.

The electrical angle number detecting portion 42B outputs a count value θ2 corresponding to the mechanical angle and outputs an extended count value COUNT of the electrical angle, according to a change in the count value θ1 that corresponds to the electrical angle output by the two-phase encoder counter 41B. More specifically, the count value COUNT is increased or decreased according to carrying or borrowing by the two-phase encoder counter 41B.

The Z-phase abnormality detecting portion 46 determines a Z-phase signal that is input when the count value θ1 is within an appropriate range to be normal, and determines a Z-phase signal that is input when the count value θ1 is outside of that appropriate range to be abnormal. That is, the Z-phase abnormality detecting portion 46 distinguishes between an expected Z-phase signal (i.e., a Z-phase signal at an expected timing) and an unexpected Z-phase signal (i.e., a Z-phase signal at an unexpected timing).

The Z-phase abnormality determining portion 47 counts the number of Z-phase signals input unexpectedly and determines whether there is an abnormality. More specifically, the Z-phase abnormality determining portion 47 counts the number of Z-phase signals determined by the Z-phase abnormality detecting portion 46 as being abnormal, and outputs a clear signal CLR when the count value exceeds an error limit value. The value retained by the two-phase encoder counter 41B and the electrical angle number detecting portion 42B is cleared to zero by the clear signal CLR.

The motor controlling portion 44 outputs three-phase PWM signals, i.e., a U-phase PWM signal, a V-phase PWM signal, and a W-phase PWM signal, based on the count value θ3, the extended count value COUNT of the electrical angle, the torque command value TR, and the motor current values IV and IW. An IGBT in the IPM 7 is controlled on and off, and thus the motor-generator 4 is operated, based on the three-phase PWM signals, i.e., the U-phase PWM signal, the V-phase PWM signal, and the W-phase signal.

Figure 17:
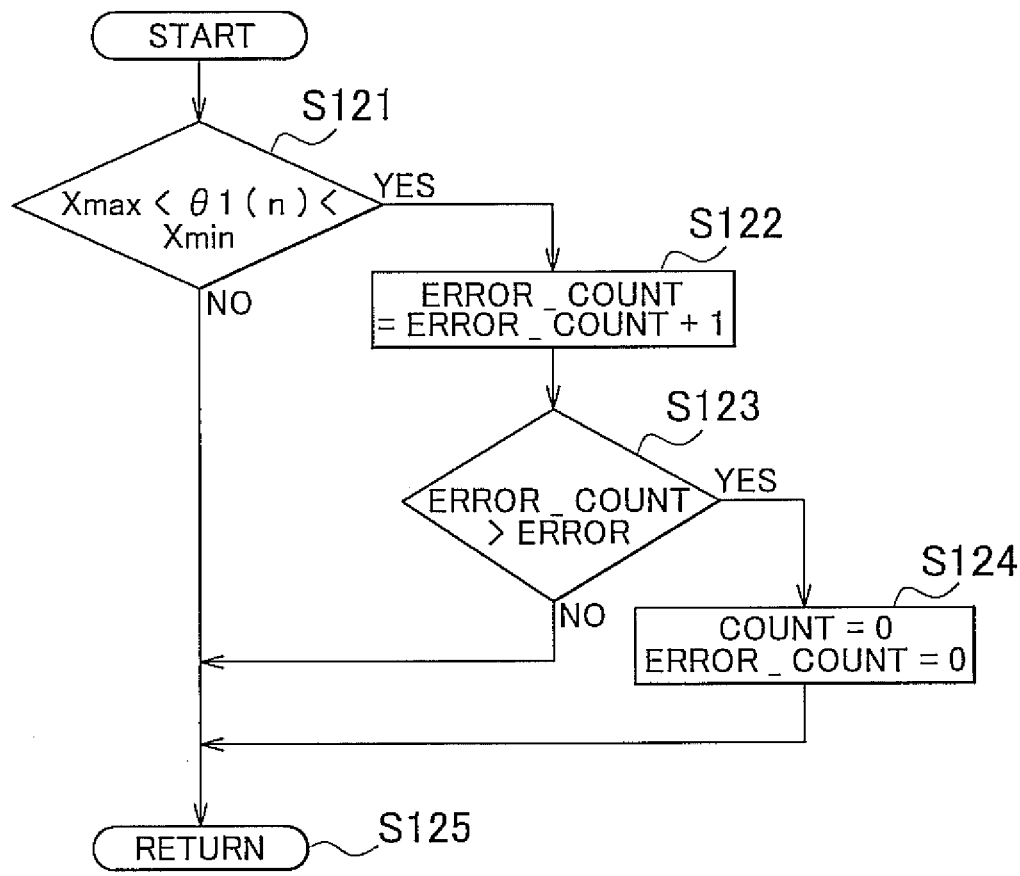
FIG. 17 is a flowchart illustrating a routine executed in the third example embodiment.

FIG. 17 is a flowchart illustrating a routine executed in the third example embodiment. The routine in this flowchart is executed in addition to the routine in FIG. 5 described in the first example embodiment, and is executed every time the Z-phase signal PZ is input to the Z-phase abnormality detecting portion 46.

Referring to FIG. 17, first in step S121, it is determined whether the value of the count value θ1 when the Z-phase signal PZ that has been input is received satisfies the condition Xmax<θ1 (n)<Xmin. Incidentally, n indicates the number of times, including the current one, that the routine in this flowchart has been executed, so the count value when the routine in this flowchart is executed the next time will be θ1 (n+1).

Figure 18:
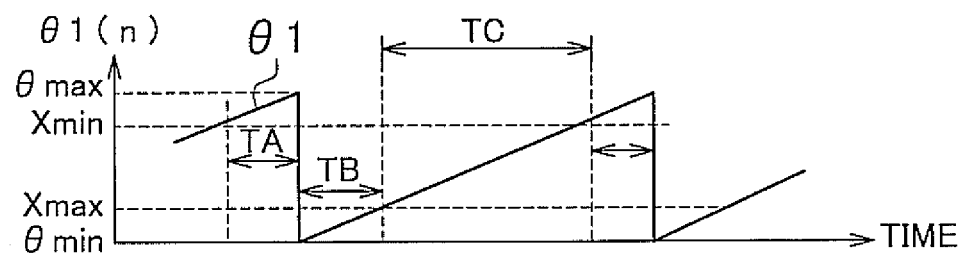
FIG. 18 is a chart illustrating Xmax and Xmin in FIG. 10.

FIG. 18 is a chart illustrating Xmax and Xmin in FIG. 10. Referring to FIG. 18, the period of time during which the value of the count value θ1 (n) is no less than Xmin and no more than θmax is denoted by TA, the period of time during which the value of the count value θ1 (n) is no less than θmin and no more than Xmax is denoted by TB, and any other period of time is denoted by TC. Xmax represents a Z-phase input normal determining threshold value near +0 degrees, and Xmin represents a Z-phase input normal determining threshold value near −0 degrees.

The Z-phase signal PZ from the R/D converter 14 is originally supposed to be output when θ1 (n)=θmax, but there are cases in which deviation occurs between the count value θ1 and the Z-phase signal PZ for some reason. For example, failure of the angle detector (i.e., the encoder, the resolver, or the R/D converter) or parts that make up the angle detector (e.g., wires and connectors) may result in deviation occurring between the actual electrical angle and the angle recognized by the angle detector, thus causing a Z-phase signal to be output. Alternatively, deviation may occur between the actual electrical angle and the angle recognized by the angle detector due to the effect of noise, thus causing a Z-phase signal to be output. It is also possible that electrical noise may be superimposed on the Z-phase signal itself.

Therefore, a Z-phase signal that is input during the period TA or the period TB is considered to be normal, and a Z-phase signal that is input during any other period is considered to be abnormal. The two-phase encoder counter 41B is cleared by a Z-phase signal that is considered to be normal, but will not be cleared by a Z-phase signal that is considered to be abnormal.

However, when a Z-phase signal is input many times during the abnormal period TC, the count value θ1 of the two-phase encoder counter 41B is also unable to be trusted. Therefore, the number of times that an abnormal Z-phase signal is generated is counted, and if that number is greater than a predetermined value, control is performed to clear the two-phase encoder counter 41B as well as clear the count value COUNT of the extended bit counted by the electrical angle number detecting portion 42B.

Referring back to FIG. 17 again, if the condition Xmax<θ1 (n)<Xmin is not satisfied in step S121 (i.e., if a Z-phase signal PZ is input during the period TA or TB in FIG. 18), the process proceeds on to step S125 and control shifts back to the main routine.

If, on the other hand, the condition Xmax<θ1 (n)<Xmin is satisfied in step S121 (i.e., if a Z-phase signal PZ is input during the period TC in FIG. 18), the process proceeds on to step S122.

In step S122, +1 is added to a count value ERROR_COUNT of the Z-phase abnormal timing input. The count value ERROR_COUNT is a count value for counting the Z-phase signal PZ input during the period TC in FIG. 18.

Then in step S123 it is determined whether the count value ERROR_COUNT has exceeded an abnormality determining threshold value ERROR. If ERROR_COUNT is greater than ERROR, the process proceeds on to step S124. If, on the other hand, ERROR_COUNT is not greater than ERROR, the process proceeds on to step S125 and control shifts back to the main routine. Incidentally, the abnormality determining threshold value ERROR may be any integral number as long as it is equal to or greater than 1. When the abnormality determining threshold value ERROR is set to 1, the count value COUNT will be reset (i.e., a reset operation will be performed) if a Z-phase signal PZ is input even once during the period TC in FIG. 18. Generally, the abnormality determining threshold value ERROR is set to a value of two or greater, so a single occurrence of a Z-phase signal PZ due to noise or the like is ignored, and a reset operation will be performed when a plurality of Z-phase signals PZ are input during the period TC in FIG. 18.

In step S124, the count value COUNT counted by the electrical angle number detecting portion 42B is cleared to zero, and simultaneously the count value ERROR_COUNT is also cleared to zero. Then the process proceeds on to step S125 and control shifts back to the main routine.

In summarizing the third example embodiment, the rotation angle detecting apparatus shown in FIG. 16 includes i) the angle detecting portion 12 and 14 in which the angle corresponding to one cycle of an output signal is set smaller than a mechanical angle of 360°, ii) the counter 41B that outputs a digital signal that corresponds to the output signal of the angle detecting portion, and iii) the electrical angle number detecting portion 42B that detects the position of mechanical angle to which the angle indicated by the signal output from the angle detecting portion corresponds, based on a change in the count value of the counter 41B.

Preferably, the angle detecting portion is an electrical angle detecting portion 12 and 14 in which an electrical angle of 360° is set smaller than a mechanical angle of 360° and that outputs a two-phase encoder signal corresponding to the electrical angle of the rotor. The counter is a two-phase encoder counter 41B that counts the two-phase encoder signals and outputs a digital value θ1 corresponding to the electrical angle. The electrical angle number detecting portion 42B detects the position of mechanical angle to which the electrical angle indicated by the signal output from the angle detecting portion corresponds, based on a change in the count value of the counter 41B.

More preferably, the electrical angle number detecting portion 42B generates a count value θ2 in which the high order bit of the two-phase encoder counter 41B is further extended to a value that corresponds to a mechanical angle of 360°, and outputs an extended count value COUNT.

More preferably, the electrical angle number detecting portion 42B counts up or down according to the A-phase signal and the B-phase signal, and clears the count value when a Z-phase signal is input. The rotation angle detecting apparatus further includes the Z-phase abnormality detecting portion 46 that determines whether the count value of the two-phase encoder counter 41B when a Z-phase signal is input is within a predetermined range that corresponds to abnormal timing (i.e., within the period TC in FIG. 18), and the Z-phase abnormality determining portion 47 that, when it is determined by the Z-phase abnormality detecting portion 46 that that count value is within the predetermined range, counts the number of times that the Z-phase signal has been input, and when the number of times ERROR_COUNT that the Z-phase signal has been input exceeds an error count threshold value ERROR (i.e., YES in step S123), clears the extended count value θ2 and the extended bit COUNT retained by the electrical angle number detecting portion 42B.

In the third example embodiment, the counter is cleared when repeated input of a Z-phase signal at an abnormal timing is detected, so the possibility of returning to normal operation increases even if there is an erroneous operation.

In the first to the third example embodiments, a resolver is used as the rotor position detecting apparatus. A fourth example embodiment in which a Hall element is instead used as the rotor position detecting apparatus will now be described.

Figure 19:
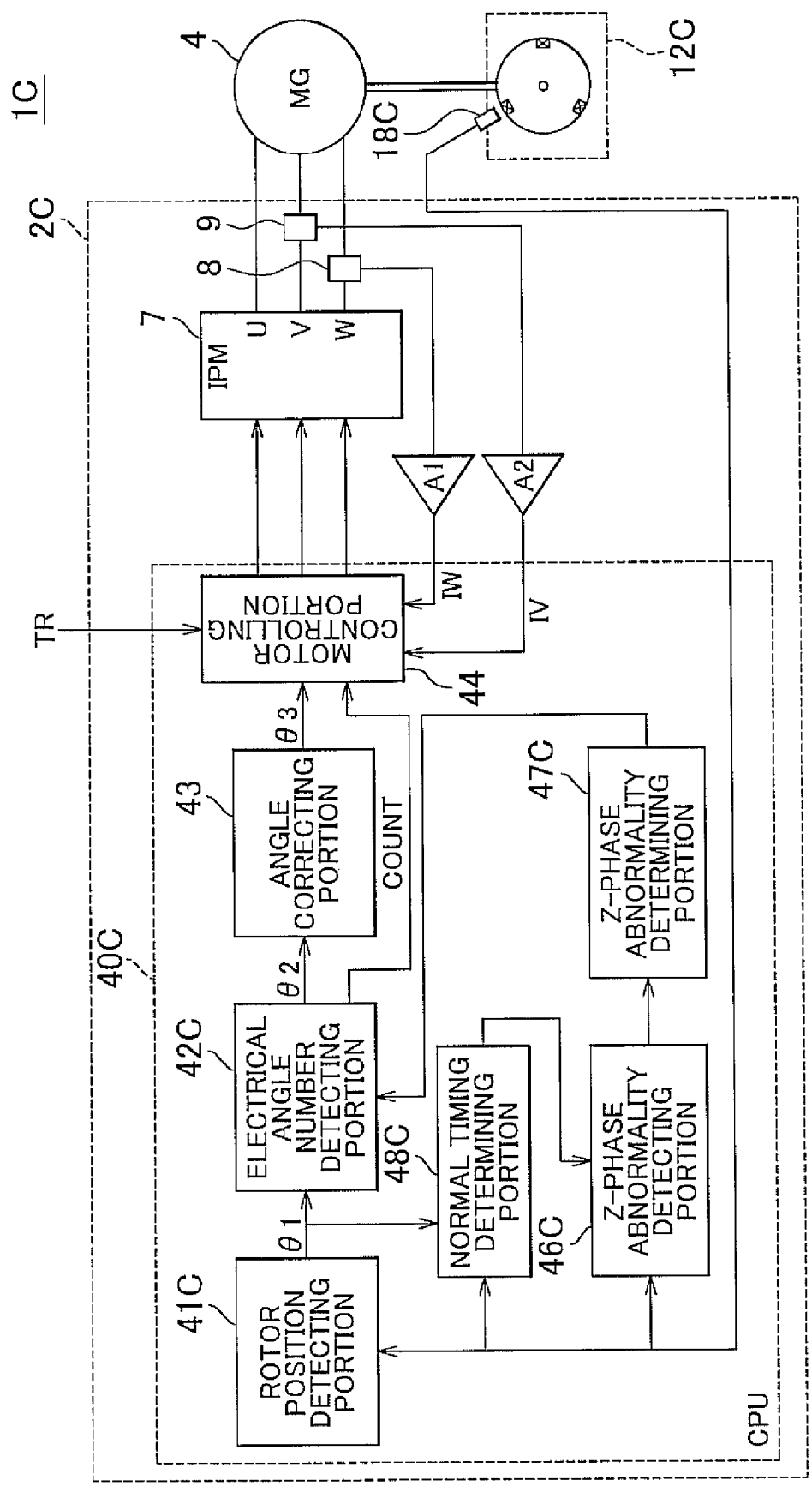
FIG. 19 is a block diagram of a vehicle in which a motor control apparatus according to a fourth example embodiment of the invention is used.
Figure 20:
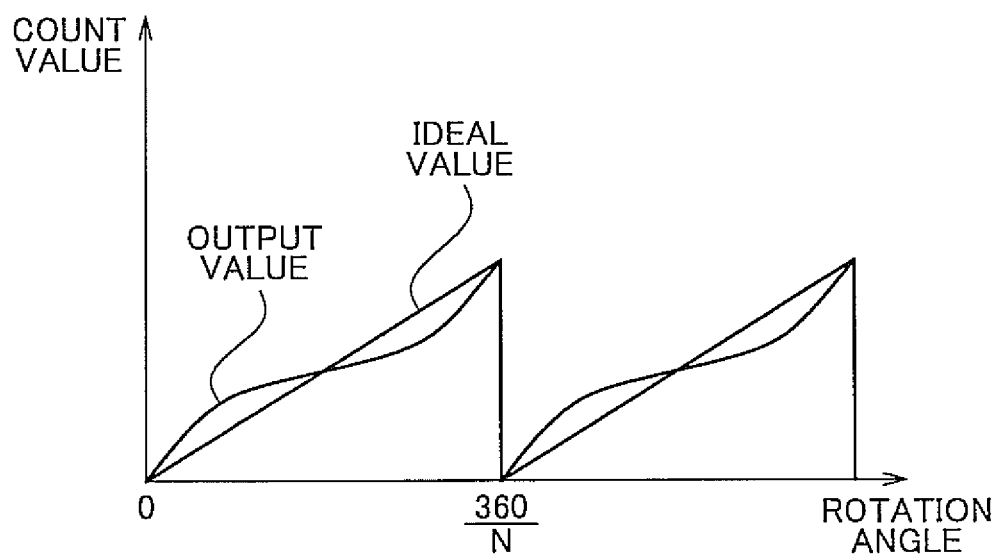
FIG. 20 is a graph of a correction of the characteristic of a resolver having a multiplication factor of angle Nx according to related art.

FIG. 19 is a block diagram of a vehicle 1C in which a motor control apparatus according to the fourth example embodiment is used. In FIG. 19, a signal corresponding to the Z-phase signal is input by a Hall element 18C.

Referring to FIG. 19, the vehicle 1C includes an inverter apparatus 2C, a motor-generator 4, and a rotor position detecting portion 12C that is connected to a rotor shaft of the motor-generator 4. If the vehicle 1C is an electric vehicle, a hybrid vehicle, or a fuel cell vehicle, the motor-generator 4 may be used to drive the wheels. Incidentally, the motor-generator 4 may also be used for another purpose.

The rotor position detecting portion 12C includes a Hall element 18C that detects the position of a magnet embedded in a rotor that is fixed to a rotating shaft of the motor-generator 4.

The inverter apparatus 2C includes a CPU 40C, an IPM 7, and current sensors 8 and 9. The IPM 7 includes a power switching element such as an IGBT for controlling the current that flows to a stator coil of the motor-generator 4. The stator coil of the motor-generator 4 includes a U-phase coil, a V-phase coil, and a W-phase coil. The U-, V-, and W-phase coils are Y-connected, so the current of the U phase can be obtained by calculation by measuring the currents of the V and W phases using the current sensors 8 and 9.

The CPU 40C includes a rotor position detecting portion 41C, an angle correcting portion 43, a motor controlling portion 44, a normal timing determining portion 48C, a Z-phase abnormality detecting portion 46C, and a Z-phase abnormality determining portion 47C. The angle correcting portion 43 and the motor controlling portion 44 perform the same operations as described in the first example embodiment, so descriptions thereof will not be repeated.

When a Hall element is used, the resolution power is low so the actual angle is unable to be detected as it is. Therefore, assuming that the motor rotation will not suddenly change, and the rotor position detecting portion 41C estimates the angle from the rotation speed obtained from the interval between input Z-phase signals, and the time that has passed after the final Z-phase signal has been input.

More specifically, for example, the rotor position detecting portion 41C includes a timer/counter that counts up by a clock signal or the like of the CPU 40C and is cleared according to a Z-phase signal from the Hall element 18C. The rotor position detecting portion 41C stores the value of the timer/counter right before it is cleared as a value C0 corresponding to 360°, and calculates the count value θ1 corresponding to the electrical angle by multiplying the ratio of that stored value C0 and the current count value C by 360°, i.e., θ1=C/C0×360.

The normal timing determining portion 48C calculates the input period during which the Z-phase signal is expected to be input next (i.e., the expected input period), and outputs a signal indicative of whether the current time corresponds to the calculated expected input period to the Z-phase abnormality detecting portion 46C. This expected input period corresponds to periods TA+TB of FIG. 18.

The Z-phase abnormality detecting period 46C detects a Z-phase signal abnormality based on whether the Z-phase signal from the Hall element 18C has been input during the expected input period. A Z-phase signal that has been input during the period TC of FIG. 18 is determined to be an abnormal signal and is ignored. Also in this case, an output signal indicting that an abnormal signal has been input is output to the Z-phase abnormality determining portion 47C.

The Z-phase abnormality determining portion 47C makes a determination regarding an abnormality based on the number of detections and the duration from the output results of the Z-phase abnormality detecting portion 46C. For example, the Z-phase abnormality determining portion 47C may determine that a Z-phase signal is abnormal when the number of times that an abnormal signal has been detected within a predetermined period of time exceeds an error threshold value ERROR_COUNT.

If the Z-phase signal is determined to be abnormal, the Z-phase abnormality determining portion 47C clears the counter of the electrical angle number detecting portion 42C.

The rotation angle detecting apparatus according to this fourth example embodiment includes an angle detecting portion 18C in which the angle corresponding to one cycle of an output signal is set smaller than a mechanical angle of 360°, a counter (i.e., the rotor position detecting portion 41C) that outputs a digital value corresponding to the output signal of the angle detecting portion, and the electrical angle number detecting portion 42C that detects the position of mechanical angle to which the angle indicated by the signal output from the angle detecting portion corresponds, based on a change in the count value θ1 of the counter (i.e., the rotor position detecting portion 41C).

Preferably, the angle detecting portion 18C is a Hall element structured to output, as an output signal, a signal indicating the completion of one cycle each time a predetermined angle is reached. The counter includes the rotor position detecting portion 41C that counts up, based on the clock signal, the intermediate count value from after an output signal has been input until the next output signal is input. The rotation angle detecting apparatus also includes the Z-phase abnormality detecting portion 46C that determines whether the count value of the counter (i.e., the rotor position detecting portion 41C) when a Z-phase signal has been input is within a predetermined range that corresponds to abnormal timing, and the Z-phase abnormality determining portion 47C that, when it is determined by the Z-phase abnormality detecting portion 46C that that count value is within the predetermined range, counts the number of times that the output signal has been input, and when the number of times that the output signal has been input exceeds the error count threshold value, clears the extended count value retained by the electrical angle number detecting portion 42C.

Similar to the third example embodiment, in the fourth example embodiment as well, the counter is cleared when repeated input of a Z-phase signal at an abnormal timing is detected, so the possibility of returning to normal operation increases even if there is an erroneous operation.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A motor control apparatus comprising:
an electrical angle detecting portion including a resolver and a resolver/digital converter, the resolver in which an electrical angle of 360° corresponds to one cycle of an output signal is set smaller than a mechanical angle of 360°, the resolver/digital converter that converts a signal from the resolver into a digital value, the resolver/digital converter outputs a two-phase encoder signal corresponding to an electrical angle of a rotor of a motor, the two-phase encoder signal that includes an A-phase signal, a B-phase signal, and a Z-phase signal;
a two-phase encoder counter that counts the two-phase encoder signal up or down according to the A-phase signal and the B-phase signal, and clears the count value when the Z-phase signal is input and outputs a digital value corresponding to the electrical angle;
an electrical angle number detecting portion that is configured to detect a position of the mechanical angle to which an electrical angle indicated by the signal output from the electrical angle detecting portion corresponds, based on a change in a count value of the two-phase encoder counter, the electrical angle number detecting portion creates an extended count value in which a high order bit of the two-phase encoder counter is further extended to a value that corresponds to a mechanical angle of 360°, and outputs the extended count value, and when the count value of the two-phase encoder counter is cleared while the count value of the two-phase counter is being increased, the electrical angle number detecting portion clears the extended count value when the count value of the two-phase encoder counter right before being cleared exceeds a threshold value; and
a motor controlling portion that is configured to determine a current command value based on a torque command value sent from outside the motor control apparatus, and correct the current command value according to an output of the position detecting portion.

2. The motor control apparatus according to claim 1, wherein the motor controlling portion determines the position of the mechanical angle to which a rotation angle of the rotor of the motor corresponds based on an output of the electrical angle number detecting portion, and performs a correction that corresponds to the rotation angle of the rotor on the current command value.

3. The motor control apparatus according to claim 2, wherein the motor controlling portion has a map that retains the torque command value and a correction coefficient corresponding to the rotation angle of the rotor, and performs the correction by multiplying the current command value by the correction coefficient.

4. The motor control apparatus according to claim 1, wherein the electrical angle detecting portion also includes a sensor that detects a mechanical angle reference position; the two-phase encoder counter counts up or down according to the A-phase signal and the B-phase signal, and clears the count value according to an output of the sensor; and the electrical angle number detecting portion clears the extended count value according to the output of the sensor.

5. The motor control apparatus according to claim 1, wherein the motor control apparatus further includes a Z-phase abnormality detecting portion that is configured to determine whether the count value of the two-phase encoder counter when the Z-phase signal has been input is within a predetermined range corresponding to abnormal timing, and a Z-phase abnormality determining portion that is configured to count the number of times the Z-phase signal has been input when it has been determined by the Z-phase abnormality detecting portion that the count value is within the predetermined range, and clear the extended count value retained by the electrical angle number detecting portion when the number of Z-phase signals that have been input exceeds an error count threshold value.

6. The motor control apparatus according to claim 1, wherein the electrical angle detecting portion outputs, as the output signal, a signal indicating that the one cycle has ended each time a predetermined angle is reached; the two-phase encoder counter includes a rotor position detecting portion that counts up an intermediate count value from after the output signal has been input until the next output signal is input, based on a clock signal; and the motor control apparatus further includes a Z-phase abnormality detecting portion that is configured to determine whether the count value of the counter when the output signal has been input is within a predetermined range corresponding to abnormal timing, and a Z-phase abnormality determining portion that is configured to count the number of times the output signal has been input when it has been determined by the Z-phase abnormality detecting portion that the count value is within the predetermined range, and clear the extended count value retained by the position detecting portion when the number of output signals that have been input exceeds an error count threshold value.

7. The motor control apparatus according to claim 1, further comprising an angle correcting portion that is configured to perform a correction that corresponds to a correct position of mechanical angle on the digital value output from the two-phase encoder counter, based on the output of the electrical angle number detecting portion.

* * * * *